(12) United States Patent
Hu et al.

(10) Patent No.: US 11,469,936 B2
(45) Date of Patent: Oct. 11, 2022

(54) DATA TRANSMISSION METHOD AND APPARATUS

(71) Applicant: HUAWEI TECHNOLOGIES CO., LTD., Guangdong (CN)

(72) Inventors: Yuanzhou Hu, Shanghai (CN); Fan Wang, Berkshire (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/323,580

(22) Filed: May 18, 2021

(65) Prior Publication Data
US 2021/0281460 A1 Sep. 9, 2021

Related U.S. Application Data

(63) Continuation of application No. PCT/CN2019/118791, filed on Nov. 15, 2019.

(30) Foreign Application Priority Data

Nov. 19, 2018 (CN) .......................... 201811378870.7

(51) Int. Cl.
*H04L 27/26* (2006.01)

(52) U.S. Cl.
CPC ...... *H04L 27/2628* (2013.01); *H04L 27/2614* (2013.01)

(58) Field of Classification Search
CPC ............. H04L 27/2614; H04L 27/2615; H04L 27/2621; H04L 27/2628; H04L 27/2636
See application file for complete search history.

(56) References Cited

U.S. PATENT DOCUMENTS 11,233,685 B2 * 1/2022 Yang .................... H04L 1/0003
2007/0098094 A1 5/2007 Yue et al.

FOREIGN PATENT DOCUMENTS

| CN | 101766008 A | 6/2010 |
|----|-------------|--------|
| CN | 101789924 A | 7/2010 |

(Continued)

OTHER PUBLICATIONS

Huawei et al., "Discussion on further PAPR reduction for uplink DFT-S-OFDM," 3GPP TSG RAN WG1 NR Ad Hoc Meeting, R1-1700077, Spokane, USA, Jan. 16-20, 2017, 6 pages.

(Continued)

*Primary Examiner* — David S Huang
(74) *Attorney, Agent, or Firm* — Fish & Richardson P.C.

(57) ABSTRACT

This application provides example data transmission methods and apparatuses, so that a PAPR of time-domain sending data can be reduced. One example method includes a transmit end performing modulation data processing on first modulation data whose length is $M_1$, to obtain second modulation data whose length is $M_2$, where $M_1<M_2$, $M_1$ and $M_2$ are positive integers, and each modulation data in the second modulation data is an element in the first modulation data. The transmit end then performs sending preprocessing, such as phase shift, Fourier transform, inverse Fourier transform, or time/frequency domain filtering on the second modulation data to obtain time-domain sending data of one symbol. The transmit end then sends the time-domain sending data on the one symbol.

20 Claims, 13 Drawing Sheets

(56) References Cited

FOREIGN PATENT DOCUMENTS

| CN | 101984615 A | 3/2011 |
|---|---|---|
| CN | 103001913 A | 3/2013 |
| CN | 104753848 A | 7/2015 |
| CN | 106849963 A | 6/2017 |
| CN | 107666455 A | 2/2018 |
| CN | 108476194 A | 8/2018 |
| CN | 107888533 B | 11/2020 |
| GB | 2412826 A | 10/2005 |
| KR | 20060010287 A | 2/2006 |

OTHER PUBLICATIONS

Huawei et al., "Short duration PUCCH for small to medium payload sizes," 3GPP TSG RAN WG1 Meeting #88, R1-1701645, Athens, Greece, Feb. 13-17, 2017, 8 pages.

Huawei et al., "Short duration PUCCH for small to medium payload sizes," 3GPP TSG RAN WG1 Meeting #88, R1-1701646, Athens, Greece, Feb. 13-17, 2017, 8 pages.

Iith et al., "SC-FDMA with frequency domain pulse-shaping for uplink," 3GPP TSG-RAN WG1#83, R1-156545, Anaheim, USA, Nov. 15-22, 2015, 10 pages.

Ezri, "Introducing STORM-Near 0dB PAPR Waveform for mmWave 5G," Jul. 26, 2017, retrieved from URL<https://www.interlligent.co.uk/wp-content/uploads/2017/05/Doron-Ezri-Introducing-STORM>, 23 pages.

Boonkajay et al., "2-step signal detection for blind time-domain selected mapping," IEICE Technical Report, Oct. 2016, 6 pages.

Office Action in Chinese Application No. 201811378870.7, dated Mar. 1, 2021, 12 pages.

PCT International Search Report and Written Opinion in International Application No. PCT/CN2019/118791, dated Feb. 7, 2020, 16 pages.

3GPP TS 38.211 V15.3.0 (Sep. 2018), "3rd Generation Partnership Project;Technical Specification Group Radio Access Network;NR;Physical channels and modulation(Release 15)," Sep. 2018, 96 pages.

* cited by examiner

400

A terminal device performs modulation data processing on first modulation data whose length is $M_1$, to obtain second modulation data whose length is $M_2$ — S410

The terminal device performs sending preprocessing on the second modulation data to obtain time-domain sending data of one symbol — S420

The terminal device sends the time-domain sending data on the symbol — S430

500

| A terminal device sequentially performs first phase shift and Fourier transform on first modulation data whose length is $M_1$, to obtain frequency domain data whose length is $M_1$ | S510 |

| The terminal device performs cyclic extension on the frequency domain data to obtain extended data whose length is $M_2$ | S520 |

| The terminal device performs second phase shift on the extended data to obtain frequency-domain shifted data | S530 |

| The terminal device performs sending preprocessing on the frequency-domain shifted data to obtain time-domain sending data of one symbol | S540 |

| The terminal device sends the time-domain sending data on the one symbol | S550 |

DATA TRANSMISSION METHOD AND APPARATUS

CROSS-REFERENCE TO RELATED APPLICATIONS

This application is a continuation of International Application No. PCT/CN2019/118791, filed on Nov. 15, 2019, which claims priority to Chinese Patent Application No. 201811378870.7, filed on Nov. 19, 2018. The disclosures of the aforementioned applications are hereby incorporated by reference in their entireties.

TECHNICAL FIELD

This application relates to the communications field, and more specifically, to a data transmission method and an apparatus.

BACKGROUND

In a communications system, when a transmit end sends data to a receive end, time domain data generated by the transmit end may be amplified by using a power amplifier (PA) and then sent to the receive end. Output power obtained after data of a low peak to average power ratio (PAPR) passes through the PA may be greater than output power obtained after a waveform of a high PAPR passes through the PA, and receiver performance is also better. Therefore, to ensure amplification efficiency and the receiver performance, time domain data may be required to have a low PAPR before being amplified by the PA. The peak to average power ratio is also referred to as a peak to average ratio.

SUMMARY

This application provides a data transmission method and an apparatus, so that a PAPR of time-domain sending data can be reduced.

According to a first aspect, a data transmission method is provided, where the method may be performed by a transmit end, or may be performed by a chip configured at a transmit end. This is not limited in this application. The transmit end may be, for example, a terminal device or a network device.

Specifically, the method includes: performing modulation data processing on first modulation data whose length is $M_1$, to obtain second modulation data whose length is $M_2$, where $M_1 < M_2$, $M_1$ and $M_2$ each are a positive integer, and any modulation data in the second modulation data is an element in the first modulation data; performing sending preprocessing on the second modulation data to obtain time-domain sending data of one symbol, where the sending preprocessing includes Fourier transform and inverse Fourier transform; and sending the time-domain sending data on the one symbol.

Optionally, the first modulation data may be data obtained after binary phase shift keying (BPSK) modulation, or the first modulation data is BPSK modulation data. However, this is not limited in this embodiment of this application. For example, the first modulation data may be alternatively data obtained after quadrature phase shift keying (QPSK) modulation.

It should be understood that, that the sending preprocessing includes Fourier transform and inverse Fourier transform means that the Fourier transform and the inverse Fourier transform coexist. In this way, after performing the sending preprocessing on the second modulation data, the terminal device may obtain a single carrier frequency division multiple access (SC-FDMA) symbol. In other words, the time-domain sending data may be an SC-FDMA symbol.

Optionally, in this application, the Fourier transform may be discrete Fourier transform (DFT) or fast Fourier transform (FFT), or may be another form of Fourier transform. This is not limited in this application.

Optionally, in this application, the inverse Fourier transform may be inverse discrete Fourier transform (IDFT) or inverse fast Fourier transform (IFFT), or may be another form of inverse Fourier transform. This is not limited in this application.

Based on the data transmission method provided in this application, after the first modulation data changes into the second modulation data of a longer length, some modulation data in the second modulation data is related to each other, and is not entirely random. In addition, because a Fourier transform operation and an inverse Fourier transform operation are performed on the time-domain sending data of one symbol that is obtained from the second modulation data, the time-domain sending data may be approximately obtained by performing oversampling and then superposition on the second modulation data; and because some modulation data in the second modulation data is related to each other, a probability of random superposition of the second modulation data during oversampling and superposition is reduced, and a probability of forward superposition is also reduced, thereby reducing a PAPR. In short, there is also specific correlation between some data in the time-domain sending data of one symbol that is obtained based on the second modulation data. Based on the correlation, the PAPR can be further reduced.

In addition, it is found through simulation that, in the data transmission method provided in this application, the PAPR of the time-domain sending data can be reduced to less than 2 dB. In addition, the data transmission method provided in this application may be applied to first modulation data of any length, and is not limited to first modulation data of an even length.

In some implementations of the first aspect, $M_2 = K \cdot M_1$, and K is an integer greater than 1.

Through enabling $M_1$ and $M_2$ to meet the foregoing relationship, implementation complexity of modulation data processing at the transmit end can be simplified.

In some implementations of the first aspect, the first modulation data and the second modulation data meet the following relationship:

$$d_2(m_2) = d_1(m_1),\ m_1 = 0, 1, 2, \ldots, M_1-1,\ m_2 = K \cdot m_1 + k,$$
$$m_2 = 0, 1, 2, \ldots, M_2-1,\ k = 0, 1, 2, \ldots, K-1,$$

where
$d_1$ is the first modulation data, $d_1(m_1)$ is an $m_1^{th}$ element in the first modulation data, $d_2$ is the second modulation data, and $d_2(m_2)$ is an $m_2^{th}$ element in the second modulation data.

Through enabling the first modulation data and the second modulation data to meet the foregoing relationship, some modulation data in the second modulation data is related to each other, and is not entirely random, so that a PAPR can be reduced.

Further, the sending preprocessing further includes phase shift or further includes phase shift and filtering, and the filtering is frequency domain filtering or time domain filtering. Even further, the sending preprocessing may further include a cyclic prefix (CP) addition operation.

The phase shift, the Fourier transform, and the inverse Fourier transform are sequentially performed on the second modulation data $d_2$ to obtain the time-domain sending data. Alternatively, the phase shift, the Fourier transform, the inverse Fourier transform, and CP addition are sequentially performed on the second modulation data $d_2$ to obtain the time-domain sending data.

Alternatively, the phase shift, the Fourier transform, the inverse Fourier transform, and the time domain filtering are sequentially performed on the second modulation data $d_2$ to obtain the time-domain sending data. Alternatively, the phase shift, the Fourier transform, the inverse Fourier transform, the time domain filtering, and CP addition are sequentially performed on the second modulation data $d_2$ to obtain the time-domain sending data.

Alternatively, the phase shift, the Fourier transform, the frequency domain filtering, and the inverse Fourier transform are sequentially performed on the second modulation data $d_2$ to obtain the time-domain sending data. Alternatively, the phase shift, the Fourier transform, the frequency domain filtering, the inverse Fourier transform, and CP addition are sequentially performed on the second modulation data $d_2$ to obtain the time-domain sending data.

In this embodiment, a phase factor $e^{j \cdot \varphi_{m2}}$ of the phase shift may be $e^{j\pi \times m_2/2}$, $e^{-j\pi \times m_2/2}$, $e^{j\pi \times (m_2 \bmod 2)/2}$, or $e^{-j\pi \times (m_2 \bmod 2)/2}$.

Further, the phase factor may be further related to a symbol index, but this is not limited in this application. For example, an index of a symbol on which the second modulation data is located is represented as l, and a value of the phase factor $e^{j \cdot \varphi_{m2}}$ may be alternatively $e^{j\pi \times (m_2+l)/2}$, $e^{-j\pi \times (m_2+l)/2}$, $e^{j\pi \times ((m_2+l) \bmod 2)/2}$, or $e^{-j\pi \times ((m_2+l) \bmod 2)/2}$.

Based on the method in this embodiment of this application, the first modulation data may be BPSK modulation data, and the second modulation data may be BPSK modulation data. After the phase shift is performed on the second modulation data, Pi/2-BPSK modulation data can be obtained, so that a PAPR of the finally obtained time-domain sending data can be further reduced.

In some implementations of the first aspect, the first modulation data and the second modulation data meet the following relationship:

$d_2(m_2)=d_1(m_1)$, $m_1=0, 1, 2, \ldots, M_1-1$, $m_1=m_2 \bmod M_1$, $m_2=0, 1, 2, \ldots, M_2-1$, where
  mod represents a modulo operation, $d_1$ is the first modulation data, $d_1(m_1)$ is an $m_1{}^{th}$ element in the first modulation data, $d_2$ is the second modulation data, and $d_2(m_2)$ is an $m_2{}^{th}$ element in the second modulation data.

Through enabling the first modulation data and the second modulation data to meet the foregoing relationship, some modulation data in the second modulation data is related to each other, and is not entirely random, so that a PAPR can be reduced.

Further, the sending preprocessing further includes phase shift and data extraction or further includes phase shift, filtering, and data extraction, and the filtering is frequency domain filtering or time domain filtering. Even further, the sending preprocessing may further include a cyclic prefix (CP) addition operation.

The phase shift and the Fourier transform are sequentially performed on the second modulation data to obtain frequency domain data whose length is $M_2$. Then, the data extraction is performed on the frequency domain data to obtain extracted frequency domain data whose length is $M_1$, where the extracted frequency domain data is some elements in the frequency domain data. The inverse Fourier transform is performed on the extracted frequency domain data to obtain the time-domain sending data, or the inverse Fourier transform and the CP addition are sequentially performed on the extracted frequency domain data to obtain the time-domain sending data.

Alternatively, after the extracted frequency domain data is obtained, the frequency domain filtering and the inverse Fourier transform may be sequentially performed on the extracted frequency domain data to obtain the time-domain sending data. Alternatively, CP addition processing is performed after the inverse Fourier transform to obtain the time-domain sending data.

Alternatively, after the extracted frequency domain data is obtained, the inverse Fourier transform and the time domain filtering may be sequentially performed on the extracted frequency domain data to obtain the time-domain sending data. Alternatively, the terminal device performs CP addition processing after the time domain filtering to obtain the time-domain sending data.

It should be understood that, in the foregoing descriptions, locations of a data extraction operation and a frequency domain filtering operation may be exchanged.

In this embodiment, a phase factor $e^{j \cdot \varphi_{m2}}$ of the phase shift may be $e^{j\pi \times m_2/2}$, $e^{-j\pi \times m_2/2}$, $e^{j\pi \times (m_2 \bmod 2)/2}$, or $e^{-j\pi \times (m_2 \bmod 2)/2}$.

Further, the phase factor may be further related to a symbol index, but this is not limited in this application. For example, an index of a symbol on which the second modulation data is located is represented as l, and a value of the phase factor $e^{j \cdot \varphi_{m2}}$ may be alternatively $e^{j\pi \times (m_2+l)/2}$, $e^{-j\pi \times (m_2+l)/2}$, $e^{j\pi \times ((m_2+l) \bmod 2)/2}$, or $e^{-j\pi \times ((m_2+l) \bmod 2)/2}$.

Based on the method in this embodiment of this application, the first modulation data may be BPSK modulation data, and the second modulation data may be BPSK modulation data. After the phase shift is performed on the second modulation data, Pi/2-BPSK modulation data can be obtained, so that a PAPR of the finally obtained time-domain sending data can be further reduced.

In some implementations of the first aspect, a value of a location $I_{k'}$ in the frequency domain data, of each element in the extracted frequency domain data is determined based on a value of K.

For example, when the phase factor of the phase shift is $e^{j\pi \times m_2/2}$, the location $I_{k'}$ may be $(K \times M_1/4) \bmod K + k' \times K$, and when the phase factor of the phase shift is $e^{-j\pi \times m_2/2}$, the location $I_{k'}$ may be $(-K \times M_1/4) \bmod K + k' \times K$.

For example, it is assumed that the length $M_1$ of the first modulation data is 3, the value of K is 4, and the phase factor of the phase shift is $e^{j\pi \times m_2/2}$. In this case, the location $I_{k'}$ of the extracted frequency domain data in frequency-domain filtering data is $I_{k'}=[3, 7, 11]$.

In some implementations of the first aspect, the first modulation data is determined based on a reference signal. For example, the first modulation data may be obtained after a demodulation reference signal (DMRS) is modulated.

According to a second aspect, a data sending method is provided, where the method may be performed by a transmit end, or may be performed by a chip configured at a transmit end. This is not limited in this application. The transmit end may be, for example, a terminal device or a network device.

Specifically, the method includes: sequentially performing first phase shift and Fourier transform on first modulation data whose length is $M_1$, to obtain frequency domain data whose length is $M_1$; performing cyclic extension on the frequency domain data to obtain extended data whose length is $M_2$, where $M_1 < M_2$, and $M_1$ and $M_2$ each are a positive integer; performing second phase shift on the extended data to obtain frequency-domain shifted data; performing sending preprocessing on the frequency-domain shifted data to obtain time-domain sending data of one symbol, where the sending preprocessing includes inverse Fourier transform; and sending the time-domain sending data on the one symbol.

Optionally, the first modulation data may be data obtained after binary phase shift keying (BPSK) modulation, or the first modulation data is BPSK modulation data. However, this is not limited in this embodiment of this application. For example, the first modulation data may be alternatively data obtained after quadrature phase shift keying (QPSK) modulation.

Optionally, the time-domain sending data may be an SC-FDMA symbol.

Optionally, in this application, the Fourier transform may be discrete Fourier transform (DFT) or fast Fourier transform (FFT), or may be another form of Fourier transform. This is not limited in this application.

Optionally, in this application, the inverse Fourier transform may be inverse discrete Fourier transform (IDFT) or inverse fast Fourier transform (IFFT), or may be another form of inverse Fourier transform. This is not limited in this application.

Based on the data transmission method provided in this application, a first phase shift operation, a Fourier transform operation, and a cyclic extension operation are performed on the first modulation data, so that the extended data of a longer length can be obtained. Because some modulation data in the extended data is related to each other, and is not entirely random, there is specific correlation between some data in the time-domain sending data of one symbol that is obtained based on the extended data. Based on the correlation, a PAPR can be further reduced. In addition, it can be learned through simulation that, in the data transmission method provided in this application, a PAPR of the time-domain sending data can be reduced to less than 2 dB.

In addition, the data transmission method provided in this application may be applied to first modulation data of any length, and is not limited to first modulation data of an even length.

In some implementations of the second aspect, $M_2 = K \cdot M_1$, and K is an integer greater than 1.

Through enabling $M_1$ and $M_2$ to meet the foregoing relationship, implementation complexity of cyclic extension at the transmit end can be simplified.

In some implementations of the second aspect, a phase factor of the first phase shift is determined based on a value of K; and/or a phase factor of the second phase shift is determined based on a value of $M_2$ and the value of K.

In some implementations of the second aspect, the first modulation data and shifted modulation data that is obtained after the first phase shift is performed on the first modulation data meet the following relationship:

$$d_{shift}(m_1) = d_1(m_1) \cdot e^{j \cdot \varphi_{m1}}, m_1 = 0, 1, 2, \ldots, M_1-1,$$
where $e^{j \cdot \varphi_{m1}}$ is the phase factor the first phase shift, $e^{j \cdot \varphi_{m1}} = e^{j\alpha \times K \times m_1}$ or $e^{j \cdot \varphi_{m1}} = e^{j\alpha \times (K \times m_1 + l)}$, $\alpha$ is $\pi/2$ or $-\pi/2$, and l is an index of a symbol on which the first modulation data is located; and
$d_1$ is the first modulation data, $d_1(m_1)$ is an $m_1^{th}$ element in the first modulation data, $d_{shift}$ is the shifted modulation data, and $d_{shift}(m_1)$ is an $m_1^{th}$ element in the shifted modulation data.

In some implementations of the second aspect, the extended data and the frequency-domain shifted data meet the following relationship:

$$d_{fre,shift}(k') = d_{extension}(k') \cdot e^{j\varphi_{k'}}, k' = 0, 1, 2, \ldots, M_2-1,$$
where $$e^{j\theta_{k'}} = \sum_{k_0=0}^{K-1} e^{j \times \alpha \times k_0} \cdot e^{\frac{-j2\pi \times k' \times k_0}{M_2}},$$

where
$e^{j\varphi_{k'}}$ is the phase factor of the second phase shift, $d_{extension}$ is the extended data, $d_{extension}(k')$ is a $k'^{th}$ element in the extended data, $d_{fre,shift}$ is the frequency-domain shifted data, and $d_{fre,shift}(k')$ is a $k'^{th}$ element in the frequency-domain shifted modulation data.

In some implementations of the second aspect, the sending preprocessing further includes frequency domain filtering or time domain filtering, and may further include a CP addition operation.

In some implementations of the second aspect, the first modulation data is determined based on a reference signal. For example, the first modulation data may be obtained after a demodulation reference signal (DMRS) is modulated.

According to a third aspect, an embodiment of this application provides an apparatus. The apparatus may be a transmit end, or may be an apparatus at a transmit end, or may be another apparatus that can implement corresponding functions performed by the transmit end in any design example in the first aspect or the second aspect. The transmit end may be a terminal device or a network device. The apparatus may include a processing module and a transceiver module.

For example, the processing module and the transceiver module may perform the corresponding functions performed by the transmit end in any design example in the first aspect. Specifically:

The processing module is configured to perform modulation data processing on first modulation data whose length is $M_1$, to obtain second modulation data whose length is $M_2$, where $M_1 < M_2$, $M_1$ and $M_2$ each are a positive integer, and any modulation data in the second modulation data is an element in the first modulation data.

The processing module is further configured to perform sending preprocessing on the second modulation data to obtain time-domain sending data of one symbol, where the sending preprocessing includes Fourier transform and inverse Fourier transform.

The transceiver module is configured to send the time-domain sending data on the one symbol.

In a possible design, for a relationship between $M_1$ and $M_2$, refer to specific descriptions of $M_1$ and $M_2$ in the first aspect. This is not specifically limited herein.

In a possible design, for a relationship between the first modulation data and the second modulation data, refer to specific descriptions of the first modulation data and the second modulation data in the first aspect. This is not specifically limited herein.

In a possible design, for specific content included in the sending preprocessing, refer to specific descriptions of the sending preprocessing in the first aspect. This is not specifically limited herein.

In a possible design, the first modulation data is determined based on a reference signal.

For another example, the processing module and the transceiver module may perform the corresponding functions performed by the transmit end in any design example in the second aspect. Specifically:

The processing module is configured to: sequentially perform first phase shift and Fourier transform on first modulation data whose length is $M_1$, to obtain frequency domain data whose length is $M_1$; perform cyclic extension on the frequency domain data to obtain extended data whose length is $M_2$, where $M_1 < M_2$, and $M_1$ and $M_2$ each are a positive integer; perform second phase shift on the extended data to obtain frequency-domain shifted data; and perform sending preprocessing on the frequency-domain shifted data to obtain time-domain sending data of one symbol, where the sending preprocessing includes inverse Fourier transform.

The transceiver module is configured to send the time-domain sending data on the one symbol.

In a possible design, for a relationship between $M_1$ and $M_2$, refer to specific descriptions of $M_1$ and $M_2$ in the second aspect. This is not specifically limited herein.

In a possible design, for a specific form of a phase factor of the first phase shift, refer to specific descriptions of the phase factor of the first phase shift in the second aspect. This is not specifically limited herein.

In a possible design, for a specific form of a phase factor of the second phase shift, refer to specific descriptions of the phase factor of the second phase shift in the second aspect. This is not specifically limited herein.

In a possible design, for specific content included in the sending preprocessing, refer to specific descriptions of the sending preprocessing in the second aspect. This is not specifically limited herein.

In a possible design, the first modulation data is determined based on a reference signal.

According to a fourth aspect, an embodiment of this application further provides an apparatus, and the apparatus includes a processor, configured to implement a function of a transmit end in the method described in the first aspect. The apparatus may further include a memory, configured to store program instructions and data. The memory is coupled to the processor, and the processor may invoke and execute the program instructions stored in the memory, to implement a function of a transmit end in the method described in the first aspect or the second aspect. The transmit end may further include a communications interface, and the communications interface is used by the apparatus to communicate with another device. For example, when the apparatus is a terminal device, the another device is a terminal device or a network device. When the apparatus is a network device, the another device is a terminal device or a network device. For example, the communications interface may be a transceiver, a circuit, a bus, or a bus interface. This is not limited in this application.

For example, the apparatus includes:
a communications interface;
a memory, configured to store program instructions; and
a processor, configured to perform modulation data processing on first modulation data whose length is $M_1$, to obtain second modulation data whose length is $M_2$, where $M_1 < M_2$, $M_1$ and $M_2$ each are a positive integer, and any modulation data in the second modulation data is an element in the first modulation data; and perform sending preprocessing on the second modulation data to obtain time-domain sending data of one symbol, where the sending preprocessing includes Fourier transform and inverse Fourier transform; where the processor is further configured to send the time-domain sending data on the one symbol through the communications interface.

In a possible design, for a relationship between $M_1$ and $M_2$, refer to specific descriptions of $M_1$ and $M_2$ in the first aspect. This is not specifically limited herein.

In a possible design, for a relationship between the first modulation data and the second modulation data, refer to specific descriptions of the first modulation data and the second modulation data in the first aspect. This is not specifically limited herein.

In a possible design, for specific content included in the sending preprocessing, refer to specific descriptions of the sending preprocessing in the first aspect. This is not specifically limited herein.

In a possible design, the first modulation data is determined based on a reference signal.

For another example, the apparatus includes:
a communications interface;
a memory, configured to store program instructions; and
a processor, configured to: sequentially perform first phase shift and Fourier transform on first modulation data whose length is $M_1$, to obtain frequency domain data whose length is $M_1$; perform cyclic extension on the frequency domain data to obtain extended data whose length is $M_2$, where $M_1 < M_2$, and $M_1$ and $M_2$ each are a positive integer; perform second phase shift on the extended data to obtain frequency-domain shifted data; and perform sending preprocessing on the frequency-domain shifted data to obtain time-domain sending data of one symbol, where the sending preprocessing includes inverse Fourier transform; where the processor is further configured to send the time-domain sending data on the one symbol through the communications interface.

In a possible design, for a relationship between $M_1$ and $M_2$, refer to specific descriptions of $M_1$ and $M_2$ in the second aspect. This is not specifically limited herein.

In a possible design, for a specific form of a phase factor of the first phase shift, refer to specific descriptions of the phase factor of the first phase shift in the second aspect. This is not specifically limited herein.

In a possible design, for a specific form of a phase factor of the second phase shift, refer to specific descriptions of the phase factor of the second phase shift in the second aspect. This is not specifically limited herein.

In a possible design, for specific content included in the sending preprocessing, refer to specific descriptions of the sending preprocessing in the second aspect. This is not specifically limited herein.

In a possible design, the first modulation data is determined based on a reference signal.

According to a fifth aspect, an embodiment of this application further provides a computer-readable storage medium including instructions, and when the instructions are run on a computer, the computer is enabled to perform the method in any one of the first aspect or the possible implementations of the first aspect.

According to a sixth aspect, an embodiment of this application further provides a computer-readable storage medium including instructions, and when the instructions are run on a computer, the computer is enabled to perform the method in any one of the second aspect or the possible implementations of the second aspect.

According to a seventh aspect, a computer program product is provided, where the computer program product includes a computer program (which may also be referred to as code or an instruction), and when the computer program is run, a computer is enabled to perform the method in any one of the first aspect, the second aspect, and the possible implementations of the first aspect and the second aspect.

According to an eighth aspect, an embodiment of this application provides a chip system, and the chip system includes a processor, and may further include a memory, configured to implement a function of the transmit end in the foregoing method. The chip system may include a chip, or may include a chip and another discrete device.

BRIEF DESCRIPTION OF DRAWINGS

FIG. 13 is a schematic flowchart of another data transmission method according to this application;

DESCRIPTION OF EMBODIMENTS

The following describes technical solutions of this application with reference to accompanying drawings.

The technical solutions in the embodiments of this application may be applied to various communications systems, for example, a long term evolution (LTE) system, an LTE-advanced system, an LTE frequency division duplex (FDD) system, an LTE time division duplex (TDD) system, a narrow band internet of things (NB-IoT), enhanced machine type communication (eMTC), a worldwide interoperability for microwave access (WiMAX) communications system, a future fifth generation (5G) system, or new radio (NR).

For ease of understanding of the embodiments of this application, a communications system applicable to the embodiments of this application is first described in detail with reference to FIG. 1.

Figure 1:
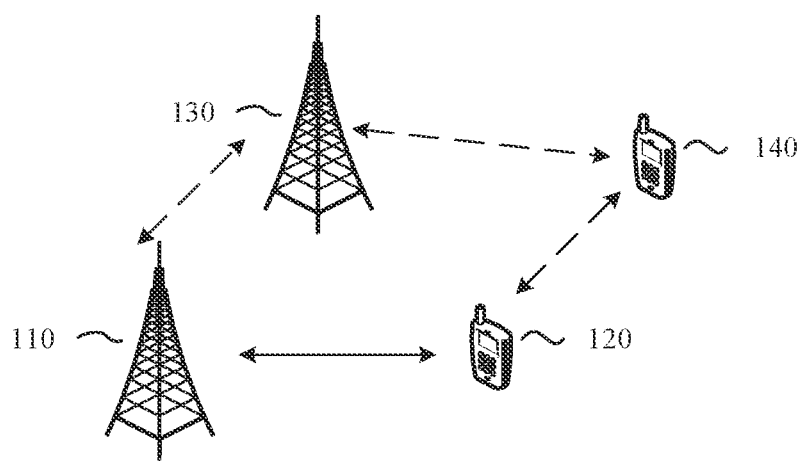
FIG. 1 is a schematic diagram of a communications system applicable to an embodiment of this application.

FIG. 1 is a schematic diagram of a communications system 100 applicable to an embodiment of this application. As shown in the figure, the communications system 100 may include at least one network device, for example, a network device 110 shown in FIG. 1. The communications system 100 may further include at least one terminal device, for example, a terminal device 120 shown in FIG. 1. Optionally, the communications system 100 may further include a network device 130 and/or a terminal device 140. The network device may communicate with the terminal device by using a radio link. The terminal device and the terminal device may communicate with each other directly or indirectly by using the network device.

The technical solutions provided in this application may be applied to wireless communication between the network device and the terminal device, for example, communication between the network device 110 and the terminal device 120; wireless communication between network devices, for example, communication between the network device 110 and the network device 130; or wireless communication between terminal devices, for example, communication between the terminal device 120 and the terminal device 140. In the embodiments of this application, the term "wireless communication" may be referred to as "communication" for short, and the term "communication" may also be described as "data transmission", "signal transmission", "information transmission", "transmission", or the like. In the embodiments of this application, transmission may include sending or receiving. For example, transmission may be uplink transmission. For example, the terminal device may send a signal to the network device; or transmission may be downlink transmission. For example, the network device may send a signal to the terminal device.

When the technical solutions provided in the embodiments of this application are used in a communications system, the technical solutions may be applied to various access technologies. For example, the technical solutions may be applied to an orthogonal multiple access (OMA) technology or a non-orthogonal multiple access (NOMA) technology. When being applied to the orthogonal multiple access technology, the technical solutions may be applied to a technology such as orthogonal frequency division multiple access (OFDMA) or single carrier frequency division multiple access (SC-FDMA). This is not limited in the embodiments of this application. When being applied to the non-orthogonal multiple access technology, the technical solutions may be applied to a technology such as sparse code multiple access (SCMA), multi-user shared access (MUSA), pattern division multiple access (PDMA), interleave-grid multiple access (IGMA), resource spreading multiple access (RSMA), non-orthogonal coded multiple access (NCMA), or non-orthogonal coded access (NOCA). This is not limited in the embodiments of this application.

When the technical solutions provided in the embodiments of this application are used in a communications system, the technical solutions may be applied to various scheduling types. For example, the technical solutions may be applied to grant-based scheduling or grant-free-based scheduling. When the technical solutions are applied to grant-based scheduling, the network device may send scheduling information to the terminal device by using dynamic signaling, and the scheduling information carries a transmission parameter; and the network device and the terminal device perform data transmission based on the transmission parameter. When the technical solutions are applied to grant-free scheduling, scheduling information may be pre-configured, or the network device may send scheduling information to the terminal device by using semi-static signaling, and the scheduling information carries a transmission parameter; and the network device and the terminal device perform data transmission based on the transmission parameter. The grant-free scheduling may also be referred to as non-dynamic scheduling, non-dynamic grant, or another name. This is not limited in the embodiments of this application.

The network device (for example, the network device 110 or the network device 130 shown in FIG. 1) involved in this application may include but is not limited to an evolved NodeB (eNB), a radio network controller (RNC), a NodeB (NB), a base station controller (BSC), a base transceiver station (BTS), a home eNodeB (for example, Home evolved NodeB, or Home NodeB, HNB), a baseband unit (BBU), an access point (AP) in a wireless fidelity (WIFI) system, a wireless relay node, a wireless backhaul node, a transmission point (TP), or a transmission and reception point (TRP); or may be a gNB or a transmission point (TRP or TP) in a 5G system such as an NR system, or one or a group of antenna panels (including a plurality of antenna panels) of a base station in a 5G system; or may be a network node that forms a gNB or a transmission point, for example, a baseband unit (BBU) or a distributed unit (DU).

In some deployments, the gNB may include a centralized unit (CU) and a DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or may be converted from information at the PHY layer. Therefore, in this architecture, higher layer signaling such as RRC layer signaling may also be considered as being sent by the DU or being sent by the DU and the CU. It may be understood that the network device may be a CU node, a DU node, or a device including a CU node and a DU node. In addition, the CU may be classified as a network device in a radio access network (RAN), or the CU may be classified as a network device in a core network (CN). This is not limited in this application.

In the embodiments of this application, an apparatus configured to implement a function of the network device may be a network device, or may be an apparatus that can support the network device in implementing the function, for example, a chip system. In the embodiments of this application, for example, the apparatus configured to implement the function of the network device is a network device, to describe the technical solutions provided in this application.

The terminal device in this application may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device in the embodiments of this application may be a mobile phone, a tablet computer (pad), a computer with a wireless receiving/transmission function, a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application.

In the embodiments of this application, an apparatus configured to implement a function of the terminal device may be a terminal device, or may be an apparatus that can support the terminal device in implementing the function, for example, a chip system. In the embodiments of this application, for example, the apparatus configured to implement the function of the terminal device is a terminal device, to describe the technical solutions provided in this application.

In this application, the chip system may include a chip, or may include a chip and another discrete device.

To facilitate understanding of the embodiments of this application, several terms involved in this application are first briefly described below.

1. Symbol

One symbol usually includes a cyclic prefix (CP) and time domain data of a period of time. For example, one symbol may be represented as s(t), and duration is $(N_{cp}+N) \cdot T_s$. It is assumed that $0 \leq t < (N_{cp}+N) \cdot T_s$. Time domain data whose time range in s(t) is $0 \leq t < N_{cp} \cdot T_s$ may be considered as a CP, and time domain data whose time range in s(t) is $N_{cp} \cdot T_s \leq t < (N_{cp}+N) \cdot T_s$ is time domain data whose period of time is $N \cdot T_s$. $T_s$ is a time unit factor. For example, $T_s$ may be a time interval between two adjacent pieces of discrete data in discrete data obtained after discrete sampling is performed on consecutive time-domain output data s(t); $N_{cp}$ is an amount of sampling data obtained after discrete sampling is performed on the CP; and N is an amount of sampling data obtained after discrete sampling is performed on the time domain data whose period of time is $N \cdot T_s$.

For example, in an LTE system, when N=2048, $N_{cp}$ is 160 or 144, and $T_s$ is 1/(15000×2048) seconds. In this case, one symbol includes a cyclic prefix and time domain data whose duration is approximately 66.7 microseconds.

2. Resource Element (RE)

The resource element is a minimum physical resource, and is usually a minimum resource for carrying data. One resource element corresponds to one subcarrier in frequency domain, and corresponds to one symbol in time domain (in other words, is located on one symbol). In other words, a location of the resource element may be determined by using an index of the symbol and an index of the subcarrier. One RE may usually carry one piece of complex data. For example, for an OFDM waveform, one RE carries one piece of modulation data; and for an SC-FDMA waveform, one RE carries one piece of data in output data obtained after Fourier transform is performed on modulation data.

3. Resource Block (RB)

One resource block is a set of several resource elements. One resource block usually includes several consecutive symbols in time domain, and includes several consecutive subcarriers in frequency domain. For example, in the LTE system, one resource block includes seven or six consecutive symbols in time domain, and includes 12 consecutive subcarriers in frequency domain. In other words, one resource block in the LTE system includes 84 or 72 resource elements.

In a communications system, when a transmit end sends data to a receive end, for example, when the terminal device 120 in the communications system 100 sends data to the network device 110, time domain data generated by the terminal device 120 may be amplified by a PA and then sent to the network device 110. Output power obtained after data of a low PAPR passes through the PA is greater than output power obtained after a waveform of a high PAPR passes through the PA, and receiver performance is also better. For example, linearity of a PA used in a high frequency (HF) scenario and an internet of things (IoT) scenario is relatively poor, and therefore a waveform of a low PAPR is required.

Figure 2:
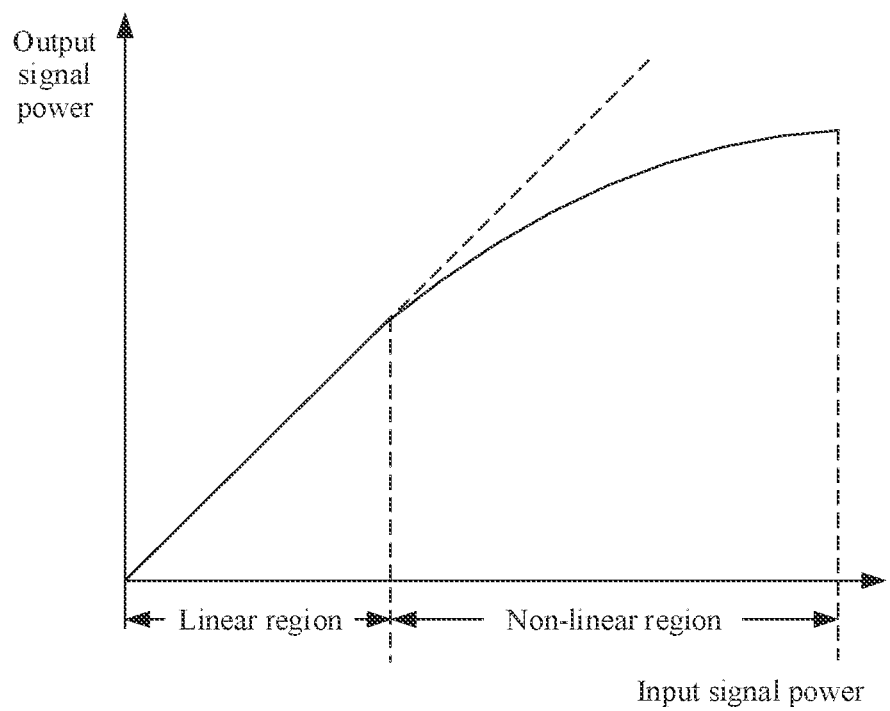
FIG. 2 is a schematic diagram of an amplification function of a PA.

For example, FIG. 2 is a schematic diagram of an amplification function of a PA. For the PA, a signal before amplification is referred to as an input signal of the PA, and an amplified signal is referred to as an output signal of the PA. As shown in FIG. 2, an amplification function of the PA for the input signal includes a linear region and a non-linear region. In the linear region, an amplification gain of the PA is a constant, in other words, a power ratio of the input signal to the output signal is a constant, and a phase of the input signal and a phase of the output signal are the same. In the non-linear region, the amplification function of the PA is distorted, in other words, an amplification gain of the PA decreases with an increase of power of the input signal, and even the PA has no amplification effect. In addition, a phase of the input signal and a phase of the output signal may also be different, in other words, the PA may change, in the non-linear region, nature of a signal that needs to be sent, affecting demodulation performance of the signal at a receive end. Therefore, amplification efficiency decreases when the PA works in the non-linear region.

After a waveform of sending data passes through a non-linear PA, data sampling points of different amplitudes are distorted to different extents due to different amplitudes of different data sampling points, in other words, amplitudes and phases of the data sampling points of different amplitudes do not change linearly. Input signal power corresponding to a data sampling point of an extremely large amplitude is located in the non-linear region of the PA, so that input data is non-linearly amplified, and a waveform is distorted. Waveform distortion causes out of band (OOB) leakage improvement, out-of-band performance deterioration, and introduction of interference, in other words, an error vector magnitude (EVM) is increased. A waveform distortion degree is proportional to a PAPR, in other words, a higher PAPR of the sending data leads to more serious distortion suffered from after passing through the non-linear PA. For a transmission system, there are corresponding requirements for out of band leakage and an EVM. In this case, to ensure that OOB performance and EVM performance meet the system requirements, specific backoff needs to be performed on output power of the PA, in other words, power of input data is reduced, to be specific, data output power obtained after the data passes through the PA, so that the PA works in a more linear region, and waveform distortion is reduced. However, compared with not reducing the data output power, if the data output power is reduced, there is loss in data demodulation performance. Consequently, a data transmission rate of the system is reduced.

Therefore, in a scenario in which linearity of the PA is relatively poor, a waveform of a low PAPR can increase output power of the PA, thereby improving demodulation performance.

In an implementation, the transmit end may use, as to-be-sent modulation data, modulation data obtained through Pi/2-BPSK modulation, and obtain a single carrier frequency domain multiple access (SC-FDMA) waveform from the to-be-sent modulation data. In addition, a filtering operation is introduced, so that a PAPR can be reduced to approximately 2 dB.

Figures 3, 4:
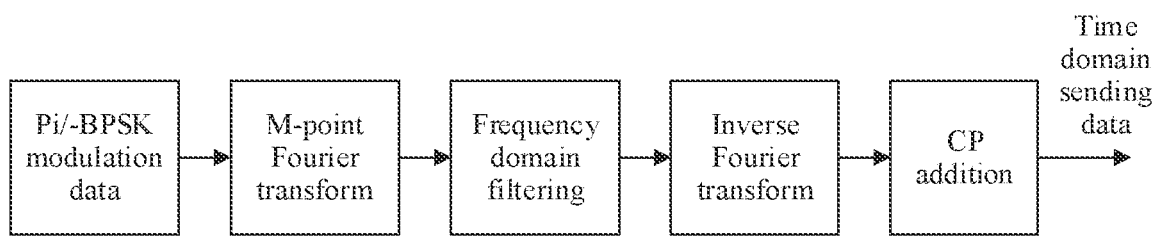
FIG. 3 is a schematic block diagram of sending processing performed on Pi/2-BPSK modulation data whose length is M.
FIG. 4 is a schematic flowchart of a data transmission method according to this application.

Specifically, as shown in FIG. 3, M pieces of frequency domain data are obtained after M-point Fourier transform is performed on Pi/2-BPSK modulation data whose length is M, the M pieces of frequency domain data are multiplied by M filter coefficients element by element to perform frequency domain filtering, and each piece of frequency domain data is multiplied by a respective filter coefficient element by element. Then, inverse Fourier transform is performed, a cyclic prefix (CP) is added to obtain time-domain sending data of one symbol, and finally, the obtained time-domain sending data is sent on the symbol. Filtering may be alternatively time domain filtering.

However, in another scenario such as a high frequency scenario or an internet of things scenario, a PAPR of 2 dB may not meet a requirement, in other words, these scenarios may require an even lower PAPR. Therefore, a PAPR of data needs to be further reduced.

Based on this, this application provides another data transmission method, so that a PAPR of modulation data can be reduced to less than 2 dB. Therefore, output power of a PA can be further increased, and demodulation performance can be further improved.

The embodiments of this application are described below in detail with reference to the accompanying drawings.

It may be understood that "first", "second", and various numeric numbers in the following embodiments are merely differentiated for ease of description, and are not used to limit the scope of the embodiments of this application. For example, different phase shift operations, different indication information, and the like are differentiated.

It should also be understood that, in the following embodiments, "predefined" or "preconfigured" may be implemented by pre-storing corresponding code or a corresponding table in a device (for example, including a terminal device and a network device) or in another manner that may be used to indicate related information. A specific implementation is not limited in this application.

It should be further understood that a "protocol" in the embodiments of this application may be a standard protocol in the communications field, for example, may include an LTE protocol, an NR protocol, and a related protocol applied to a future communications system. This is not limited in this application.

The data transmission method provided in this application may be applied to downlink communication, or may be applied to uplink communication. In the following descriptions, uplink communication is used as an example, in other words, a transmit end is a terminal device. First, a data transmission method provided in this application is described in detail with reference to FIG. 4.

FIG. 4 is a schematic flowchart of a data transmission method 400. As shown in the figure, the method 400 shown in FIG. 4 may include S410 to S430. Steps in the method 400 are described below in detail with reference to FIG. 4.

S410: A terminal device performs modulation data processing on first modulation data $d_1$ whose length is $M_1$, to obtain second modulation data $d_2$ whose length is $M_2$, where $M_1 < M_2$, and $M_1$ and $M_2$ each are a positive integer.

The length of the first modulation data $d_1$ is $M_1$, in other words, the first modulation data $d_1$ includes $M_1$ pieces of modulation data. $d_1(m_1)$ is an $m_1^{th}$ ($m_1 = 0, 1, 2, \ldots, M_1 - 1$) element in the first modulation data $d_1$, namely, an $m_1^{th}$ piece of modulation data.

The first modulation data may be data obtained after BPSK modulation, or the first modulation data is BPSK modulation data. However, this is not limited in this embodiment of this application. For example, the first modulation data may be alternatively data obtained after QPSK modulation. In the following descriptions, BPSK modulation data is mainly used as an example of the first modulation data to describe this application in detail.

A feature of the BPSK modulation data is that amplitudes of two adjacent modulation data points are the same, and a phase difference is 0 or π. Therefore, for BPSK modulation data that corresponds to one symbol and whose length is $M_1$, if a $0^{th}$ piece of modulation data on the symbol is 1, a first piece of modulation data on the symbol is 1 or −1, and a second piece of modulation data on the symbol is 1 or −1, in other words, a phase difference between two adjacent pieces of modulation data on the symbol is 0 or π, so that BPSK modulation is met.

For example, the first modulation data is BPSK modulation data. The first modulation data may be one or more pieces of modulation data obtained after modulation processing is performed, in a BPSK modulation manner, on a bit stream including one or more bits. The obtained one or more pieces of modulation data may be mapped to one symbol, and the symbol is any symbol in one or more symbols on which the terminal device performs data transmission. Modulation data mapped onto a symbol may be referred to as modulation data transmitted on the symbol. The bit stream may be obtained in various processing manners. For example, processing such as encoding, interleaving, and scrambling may be performed on an original bit stream to obtain the bit stream. The original bit stream may be obtained based on a service to be sent by the terminal device. This is not limited in this embodiment of this application.

An orthogonal frequency division multiplexing (OFDM) waveform is used as an example. It is assumed that the terminal device sends data on 10 symbols, and bandwidth allocated to each symbol is one RB, namely, 12 subcarriers. The 10 symbols and one RB correspond to 120 REs. The terminal device may map one piece of modulation data on each RE, and send the modulation data to a network device on the RE. For example, the bit stream of the terminal device includes 120 pieces of bit data, and the terminal device performs BPSK modulation on the 120 pieces of bit data to obtain 120 pieces of BPSK modulation data. The 120 pieces of BPSK modulation data may be divided into 10 groups, and each group includes 12 pieces of BPSK modulation data. The 10 groups of BPSK modulation data are in a one-to-one correspondence with the 10 symbols (for example, a $0^{th}$ group of BPSK modulation data corresponds to a $0^{th}$ symbol, a first group of BPSK modulation data corresponds to a first symbol, and so on). In other words, one group of BPSK modulation data may be sent on each symbol, or any group of BPSK modulation data may be considered as the first modulation data. For example, a correspondence between an input bit for performing BPSK modulation on the bit stream and output modulation data corresponding to the bit stream may be shown in Table 1(a) or Table 1(b).

TABLE 1(a)

| Input bit | Output modulation data |
|---|---|
| 0 | 1 |
| 1 | −1 |

TABLE 1(b)

| Input bit | Output modulation data |
|---|---|
| 0 | −1 |
| 1 | 1 |

For example, it is assumed that a bit stream corresponding to one symbol is [0, 0, 0, 1, 1, 1, 1, 0, 0, 1, 0, 1]. In this case, output BPSK modulation data obtained based on Table 1(a) is [1, 1, 1, −1, −1, −1, −1, 1, 1, −1, 1, −1].

In a complete data transmission process, usually, in addition to data, a reference signal (RS) is also sent, and the reference signal may also be referred to as a pilot signal. The reference signal sent together with the data is a signal known to both the terminal device and the network device, and is mainly used to assist a receiving device in performing data demodulation. Therefore, the reference signal may also be referred to as a demodulation reference signal (DMRS). The reference signal and the data may be located on different symbols, and occupy same bandwidth in frequency domain. The terminal device sends the data and the reference signal. After receiving the corresponding data and the reference signal, the network device performs operations such as channel estimation and interpolation by using a known reference signal, to estimate a channel response of a symbol on which the data is located, and then performs operations such as equalization and demodulation by using the received data and the estimated channel response, to demodulate to-be-sent data.

As described above, the first modulation data in this application may be obtained by performing BPSK modulation on the bit stream. Further, when the bit stream is to-be-sent bit data, the terminal device in this application sends unknown data that needs to be demodulated by the network device. When the bit stream is known data, in other words, when the network device knows a to-be-sent bit stream, time-domain sending data of one symbol that is generated in this application may be used as a reference signal to assist the network device with demodulation. In other words, the time-domain sending data in this application may be a reference signal such as a DMRS or a CSI-RS.

When the time-domain sending data of one symbol that is generated in this application is used as a reference signal, a bit stream corresponding to BPSK modulation data sent on the symbol may be obtained by using a pseudo-random sequence (for example, a Gold sequence or a pseudo-noise sequence (PN sequence)). An initialized value of the pseudo-random sequence may be preconfigured or obtained based on a predefined rule, may be determined by the terminal device based on an identifier of the pseudo-random sequence, or may be notified by the network device to the terminal device by using signaling. In this way, a PAPR of obtained time-domain sending data of a symbol on which the reference signal is located is consistent with a PAPR of time-domain sending data of a symbol on which the to-be-sent modulation data is located.

In addition, in this application, the first modulation data may be alternatively modulation data known to both the terminal device and the network device, the known modulation data is preconfigured by the network device, and the known modulation data may be modulation data such as BPSK modulation data, QPSK modulation data, and 8PSK modulation data.

The length of the second modulation data $d_2$ is $M_2$, in other words, the second modulation data $d_2$ includes $M_2$ pieces of modulation data. $d_2(m_2)$ is an $m_2^{th}$ ($m_2=0, 1, 2, \ldots, M_2-1$) element in the second modulation data $d_2$, namely, an $m_2^{th}$ piece of modulation data.

Any modulation data in the second modulation data $d_2$ is an element in the first modulation data $d_1$, in other words, any modulation data in the second modulation data $d_2$ belongs to the first modulation data $d_1$. It should be understood that an element in the first modulation data $d_1$ is modulation data in the first modulation data $d_1$.

Optionally, in an embodiment, $M_1$ and $M_2$ meet $M_2=M_1 \cdot K$. K is an integer greater than 1. K may be a preconfigured fixed value. For example, K=2 is preconfigured. K may be alternatively notified by the network device to the terminal device by using signaling.

When $M_2=M_1 \cdot K$, the modulation data processing in S410 may be specifically any one of the following modulation data processing manners 1 to 3. The three manners are described below in detail.

Modulation Data Processing Manner 1

Any modulation data in the first modulation data $d_1$ is repeated K times, and different modulation data are sequentially arranged after being repeated K times, to obtain the second modulation data $d_2$.

In other words, the first modulation data $d_1$ and the second modulation data $d_2$ meet the following relationship:

$$d_2(m_2)=d_1(m_1), m_1=0, 1, 2, \ldots, M_1-1, m_2=K \cdot m_2+k,$$
$$m_2=0, 1, 2, \ldots, M_2-1, k=0, 1, 2, \ldots, K-1.$$

Figure 5:
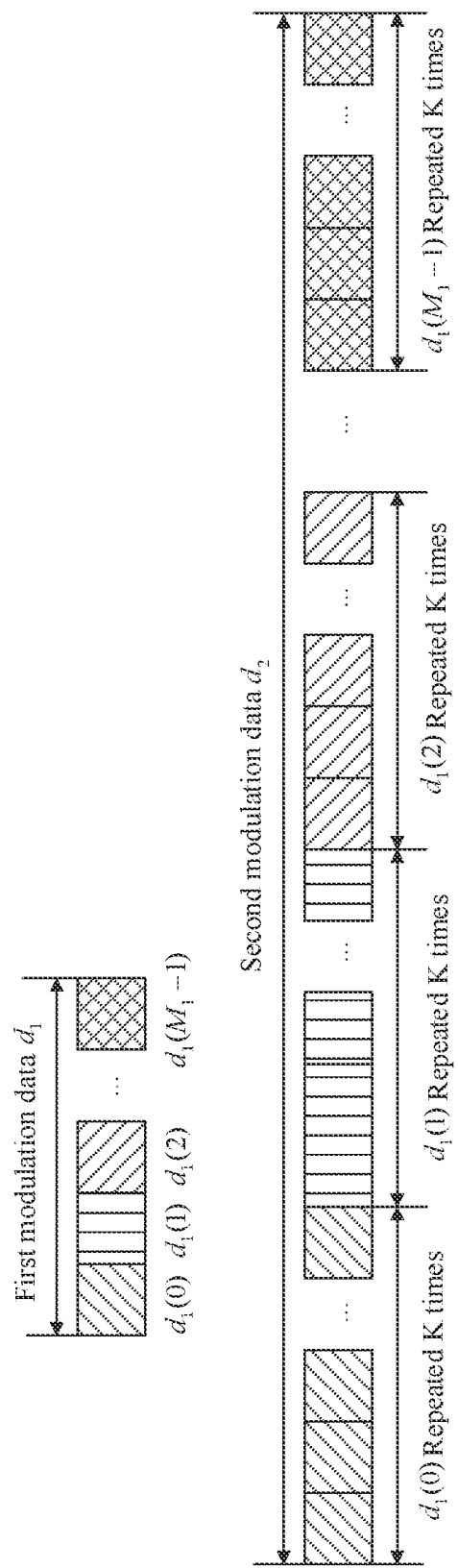
FIG. 5 is a schematic diagram in which modulation data processing is implemented in a modulation data processing manner 1.

Specifically, for a relationship between the first modulation data $d_1$ and the second modulation data $d_2$, refer to FIG. 5.

For example, it is assumed that the length of the first modulation data $d_1$ is 3, and is represented as $d_1=[d_1(0), d_1(1), d_1(2)]$, and a value of K is 4. In this case, the second modulation data may be represented as:

$$d_2=[d_1(0), d_1(0), d_1(0), d_1(0), d_1(1), d_1(1), d_1(1),$$
$$d_1(1), d_1(2), d_1(2), d_1(2), d_1(2)].$$

Modulation Data Processing Manner 2

An $m_1^{th}$ piece of modulation data $d_1(m_1)$ in the first modulation data $d_1$ is repeated K times, and K $d_1(m_1)$ obtained after K times of repetition are arranged at equal intervals $K_{step}$ in the second modulation data $d_2$, where $K_{step}$ is a positive integer, and $K_{step}$ may be evenly divided by the length $M_2$ of the second modulation data, for example, $K_{step}=2$. $K_{step}$ may be preconfigured, or may be notified by the network device to the terminal device by using signaling.

For example, it is assumed that the length of the first modulation data is 3, and is represented as $d_1=[d_1(0), d_1(1), d_1(2)]$, and a value of K is 4. In this case, data in the first modulation data is arranged at equal intervals 2 in the second modulation data, and a possible arrangement manner may be a form shown in FIG. 6.

Figure 6:
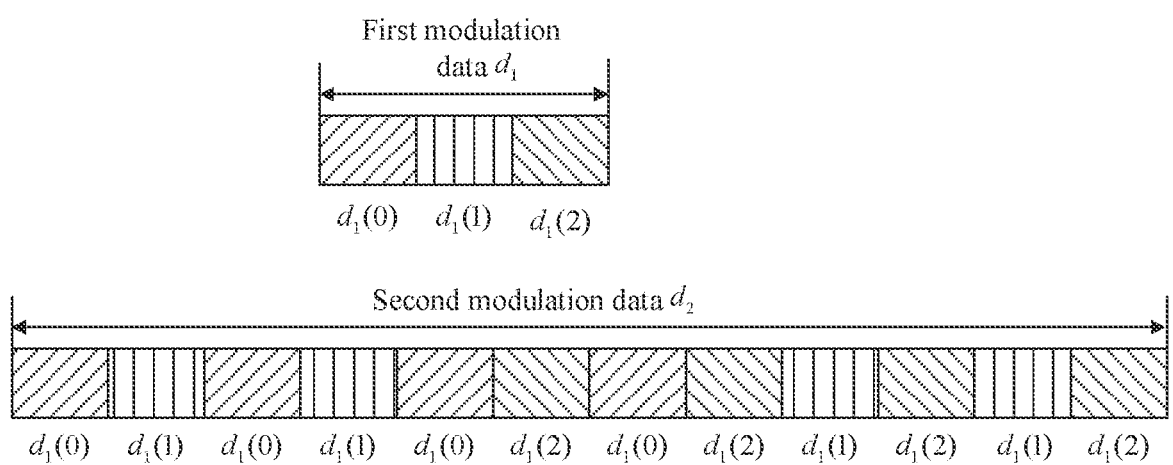
FIG. 6 is a schematic diagram in which modulation data processing is implemented in a modulation data processing manner 2.

As shown in FIG. 6, an $m_1^{th}$ piece of modulation data $d_1(m_1)$ in the first modulation data $d_1$ is repeated K times, and K $d_1(m_1)$ obtained after K times of repetition are first sequentially arranged at locations 0, 2, 4, 6, 8, and 10, and are then sequentially arranged at locations 1, 3, 5, 7, 9, and 11. In other words, when K $d_1(m_1)$ are arranged at equal intervals $K_{step}$, K $d_1(m_1)$ obtained after K times of repetition are sequentially arranged at locations $k_{step}$, $k_{step}+K_{step}$, $k_{step}+2K_{step}$, $k_{step}+3K_{step}$, . . . , $k_{step}+(M_2/K_{step}-1) K_{step}$, where $k_{step}=0, 1, 2, \ldots, K_{step}-1$ Modulation Data Processing Manner 3

The first modulation data $d_1$ is cyclically extended to obtain the second modulation data $d_2$. In other words, when $M_2=M_1 \cdot K$, the first modulation data $d_1$ is repeated K times to obtain the second modulation data $d_2$.

Alternatively, in other words, the first modulation data $d_1$ and the second modulation data $d_2$ meet the following relationship:

$$d_2(m_2)=d_1(m_1), m_1=0, 1, 2, \ldots, M_1-1, m_1=m_2$$
$$\bmod M_1, m_2=0, 1, 2, \ldots, M_2-1,$$

where mod represents a modulo operation, and xmody represents x modulo Y, for example, 7 mod 5=2.

Figure 7:
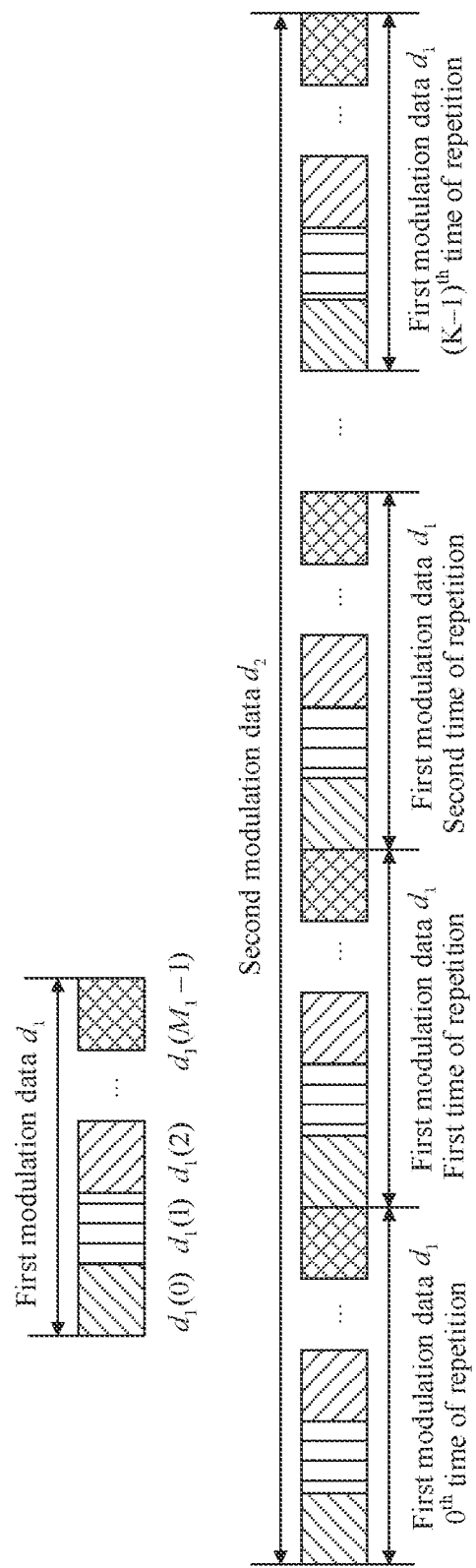
FIG. 7 is a schematic diagram in which modulation data processing is implemented in a modulation data processing manner 3.

Specifically, for a relationship between the first modulation data $d_1$ and the second modulation data $d_2$, refer to FIG. 7.

For example, it is assumed that the length of the first modulation data is 3, and is represented as $d_1=[d_1(0), d_1(1), d_1(2)]$, and a value of K is 4. In this case, the second modulation data may be represented as:

$$d_2=[d_1(0), d_1(1), d_1(2), d_1(0), d_1(1), d_1(2), d_1(0),$$
$$d_1(1), d_1(2), d_1(0), d_1(1), d_1(2)].$$

In conclusion, any processing in the modulation data processing manners 1 to 3 may be performed on the first modulation data $d_1$, to obtain the second modulation data $d_2$.

S420: The terminal device performs sending preprocessing on the second modulation data $d_2$ to obtain time-domain sending data of one symbol.

The sending preprocessing includes both Fourier transform and inverse Fourier transform, in other words, the Fourier transform and the inverse Fourier transform coexist. In this way, after performing the sending preprocessing on the second modulation data $d_2$, the terminal device may obtain an SC-FDMA symbol. In other words, the time-domain sending data may be an SC-FDMA symbol.

S430: The terminal device sends the time-domain sending data on the symbol (or the one symbol).

Optionally, the sending preprocessing in S420 may be implemented in the following sending preprocessing manner 1 or 2.

Further, the sending preprocessing manner 1 may be applied to a scenario in which the modulation data processing is implemented in the modulation data processing manner 1 or 2, and the sending preprocessing manner 2 may be applied to a scenario in which the modulation data processing is implemented in the modulation data processing manner 3. However, this is not limited in this embodiment of this application.

The sending preprocessing manner 1 and the sending preprocessing manner 2 are described below.

Sending Preprocessing Manner 1

In addition to Fourier transform and inverse Fourier transform, the sending preprocessing may further include phase shift. Further, the sending preprocessing may further include filtering. The filtering may be frequency domain filtering or time domain filtering.

Specifically, the terminal device may sequentially perform the phase shift, the Fourier transform, and the inverse Fourier transform on the second modulation data $d_2$ to obtain the time-domain sending data. Alternatively, the terminal device may sequentially perform the phase shift, the Fourier transform, the inverse Fourier transform, and CP addition on the second modulation data $d_2$ to obtain the time-domain sending data.

Alternatively, the terminal device may sequentially perform the phase shift, the Fourier transform, the inverse Fourier transform, and the time domain filtering on the second modulation data $d_2$ to obtain the time-domain sending data. Alternatively, the terminal device may sequentially perform the phase shift, the Fourier transform, the inverse Fourier transform, the time domain filtering, and CP addition on the second modulation data $d_2$ to obtain the time-domain sending data.

Alternatively, the terminal device may sequentially perform the phase shift, the Fourier transform, the frequency domain filtering, and the inverse Fourier transform on the second modulation data $d_2$ to obtain the time-domain sending data. Alternatively, the terminal device may sequentially perform the phase shift, the Fourier transform, the frequency domain filtering, the inverse Fourier transform, and CP addition on the second modulation data $d_2$ to obtain the time-domain sending data.

The sending preprocessing manner 1 is described below in detail with reference to data transmission methods according to this application in FIG. 8 and FIG. 9.

Figure 8:
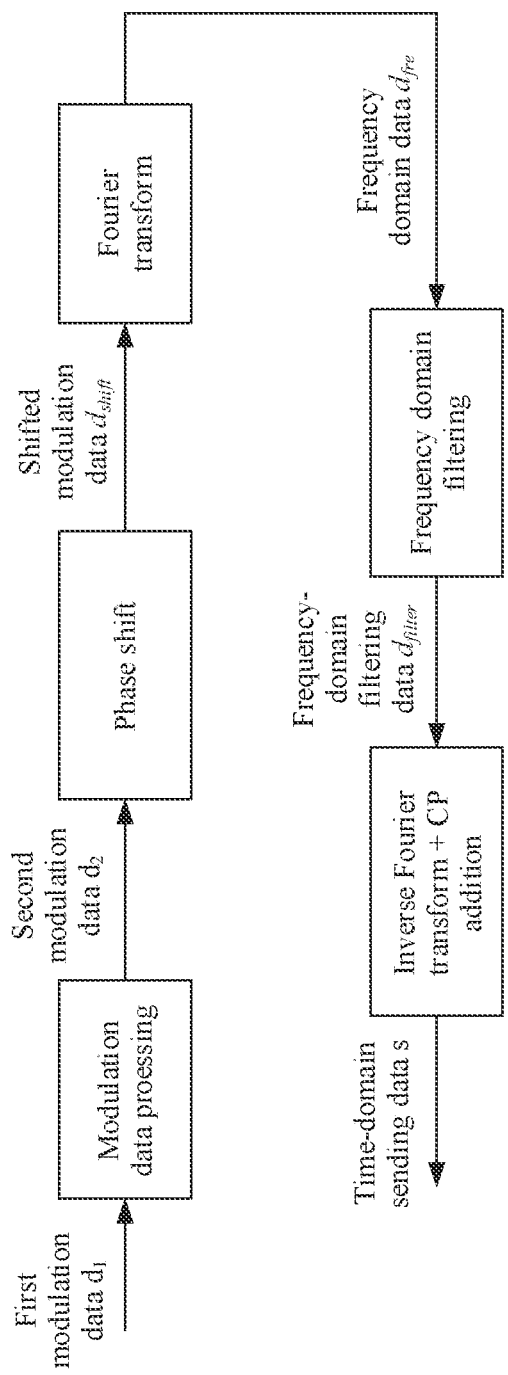
FIG. 8 is a schematic block diagram of a data transmission method according to this application.

For example, FIG. 8 is a schematic block diagram of a data transmission method. The data transmission method shown in FIG. 8 is implemented by using frequency domain filtering. Operations or steps such as phase shift, Fourier transform, inverse Fourier transform, frequency domain filtering, and CP addition in FIG. 8 are described below.

(1) Phase Shift

As shown in FIG. 8, after modulation data processing is performed on first modulation data $d_1$, second modulation data $d_2$ whose length is $M_2$ is obtained. After phase shift is performed on the second modulation data $d_2$, shifted modulation data $d_{shift}$ whose length is $M_2$ is obtained. $d_{shift}(M_2)$ is an $m_2^{th}$ piece of data in the shifted modulation data.

A phase shift operation may be multiplying an $m_2^{th}$ piece of data in the second modulation data by a corresponding phase factor $e^{j\varphi_{m_2}}$. Therefore, the shifted modulation data $d_{shift}$ may be represented as:

$$d_{shift}(m_2) = d_2(m_2) \cdot e^{j\varphi_{m_2}}, m_2 = 0, 1, 2, \ldots, M_2-1.$$

A value of the phase factor $e^{j\varphi_{m_2}}$ herein may be $e^{j\pi \times m_2/2}$, $e^{-j\pi \times m_2/2}$, $e^{j\pi \times (m_2 mod 2)/2}$, or $e^{-j\pi \times (m_2 mod 2)/2}$.

Further, the phase factor may be further related to a symbol index, but this is not limited in this application. For example, an index of a symbol on which the second modulation data is located is represented as l, and a value of the phase factor $e^{j\varphi_{m_2}}$ may be alternatively $e^{j\pi \times (m_2+l)/2}$, $e^{-j\pi \times (m_2+l)/2}$, $e^{j\pi \times ((m_2+l) mod 2)/2}$, or $e^{-j\pi \times ((m_2+l) mod 2)/2}$.

It is easy to understand that the shifted modulation data obtained after the phase shift is performed on the second modulation data is Pi/2-BPSK modulation data. That the shifted modulation data is Pi/2-BPSK modulation data indicates that a feature of the shifted modulation data is that amplitudes of two adjacent modulation data points are the same, and a phase difference is $\pi/2$ or $3\pi/2$. Therefore, if a $0^{th}$ piece of modulation data corresponding to the symbol is 1, a first piece of modulation data corresponding to the symbol may be j or –j, a second piece of modulation data corresponding to the symbol is 1 or –1, and a phase difference between adjacent pieces of modulation data on the symbol is $\pi/2$ or $3\pi/2$, so that Pi/2-BPSK modulation is met.

(2) Fourier Transform

As shown in FIG. 8, $M_2$-point Fourier transform is performed on the shifted modulation data $d_{shift}$ whose length is $M_2$, to obtain frequency domain data $d_{fre}$ whose length is $M_2$.

In an implementation, the frequency domain data $d_{fre}$ may be represented as:

$$d_{fre}(h) = \frac{1}{\sqrt{M_{scale}^{fft}}} \sum_{m_2=0}^{M_2-1} d_{shift}(m_2) e^{-j2\pi \times h \times m_2/M_2},$$

$h = 0, 1, 2, \ldots, M_2-1$.

$M_{scale}^{ffr}$ is a coefficient used to adjust power of output data obtained after the Fourier transform, and $M_{scale}^{ffr}$ is a real number, for example, $M_{scale}^{ffr} = M_2$. $M_{scale}^{ffr}$ may be a preconfigured fixed value, or may be notified by a network device to a terminal device by using signaling. $d_{fre}(h)$ is an $h^{th}$ piece of data in $d_{fre}$.

In this application, the Fourier transform may be discrete Fourier transform (DFT) or fast Fourier transform (FFT), or may be another form of Fourier transform. This is not limited in this application.

(3) Frequency Domain Filtering

As shown in FIG. 8, frequency domain filtering may be performed on the frequency domain data $d_{fre}$ whose length is $M_2$, to obtain frequency-domain filtering data $d_{filter}$ whose length is $M_2$.

Specifically, an $h^{th}$ piece of data $d_{fre}(h)$ in the frequency domain data $d_{fre}$ is multiplied by a frequency domain filter coefficient $S_{filter}(h)$ element by element, to obtain an $h^{th}$ piece of data $d_{filter}(h)$ in the frequency-domain filtering data $d_{filter}$. In other words:

$$d_{filter}(h) = d_{fre}(h) \cdot S_{filter}(h), h = 0, 1, 2, \ldots, M_2-1,$$

where $S_{filter}(h)$ is an $h^{th}$ coefficient in a frequency domain filter $S_{filter}$ whose length is $M_2$.

It should be noted that when all frequency domain filter coefficients are 1, the frequency domain data $d_{fre}$ and the frequency-domain filtering data $d_{filter}$ are consistent, and frequency domain filtering does not need to be performed or it is equivalent to that no frequency domain filtering operation is performed.

In this application, the frequency domain filter $S_{filter}$ whose length is $M_2$ may be a frequency domain form of a common filter, for example, a frequency domain form of the filter such as a square root raised cosine (SRRC) filter or a root raised cosine (RRC) filter. A specific form of the filter is not limited in this application.

$M_2$ is consistent with a quantity of subcarriers corresponding to data allocation bandwidth. To be specific, when $M_2 = K \cdot M_1$, the quantity of subcarriers corresponding to the data allocation bandwidth is K times the first modulation data.

(4) Inverse Fourier Transform and CP Addition

As shown in FIG. 8, an inverse Fourier transform operation and a CP addition operation are performed on the frequency-domain filtering data $d_{filter}$ whose length is $M_2$, to obtain time-domain sending data of one symbol.

Specifically, the inverse Fourier transform and the CP addition are performed on the frequency-domain filtering data $d_{filter}$ whose length is $M_2$, to obtain time-domain sending data s of one symbol. A possible implementation is as follows:

$$s(t) = \frac{1}{\sqrt{N_{scale}^{ifft}}} \sum_{q=q_{sc}^{start}}^{q_{sc}^{end}} d_{filter}(q - q_{sc}^{start}) e^{j2\pi \cdot \Delta f \cdot (q + q_{re,offset}) \cdot (t + t_{offset})}.$$

s(t) is data at a $t^{th}$ moment in s, $t_{start} \leq t < t_{end}$, $t_{start}$, t, and $t_{end}$ each are a real number, and $t_{end} - t_{start} = (N + N_{cp}) \cdot T_s$. For example, $t_{start} = 0$ and $t_{end} = (N + N_{cp}) \cdot T_s$. N is a positive integer, for example, N=2048. $N_{cp} \cdot T_s$ is a time length of a cyclic prefix. $\Delta f$ is a subcarrier spacing, for example, $\Delta f = 1/(N \cdot T_s)$. $T_s$ is a time unit factor, and may be preconfigured, or may be notified by the network device to the terminal device by using signaling. Optionally, $T_s$ may be a time interval between two adjacent pieces of discrete data in discrete data obtained after discrete sampling is performed on consecutive time-domain output data s(t). $t_{offset}$ is a delay offset, and a value of $t_{offset}$ may be preconfigured, for example, $t_{offset}=-N_{cp} \cdot T_s$. The value of $t_{offset}$ may be alternatively notified by the network device to the terminal device by using signaling.

$N_{scale}^{ifft}$ may be considered as a coefficient used to adjust power of output data obtained after the inverse Fourier transform, and $N_{scale}^{ifft}$ is a real number, for example, $N_{scale}^{ifft}=1$. $q_{re,offset}$ is a frequency domain offset factor, and a value of $q_{re,offset}$ may be preconfigured, for example, $q_{re,offset}=\frac{1}{2}$. The value of $q_{re,offset}$ may be alternatively notified by the network device to the terminal device by using signaling.

$q_{sc}^{start}$ is an index of a start location of a frequency domain resource to which the filtering data $d_{filter}$ is mapped, $q_{sc}^{end}$ is an index of an end location of the frequency domain resource to which the filtering data $d_{filter}$ is mapped, and $q_{sc}^{end}-q_{sc}^{start}=M_2-1$. For example, $q_{sc}^{start}=-\lfloor M_2/2 \rfloor$ and $q_{sc}^{end}=\lceil M_2/2 \rceil-1$. The index of the start location and the index of the end location of the frequency domain resource may be respectively a start location and an end location of a subcarrier corresponding to allocated bandwidth. For example, when the allocated bandwidth includes 48 subcarriers, in other words, $M_2=48$, $q_{sc}^{end}-q_{sc}^{start}=47$. It is assumed that N is 2048, to be specific, data may be mapped on a maximum of 2048 subcarriers. Indexes corresponding to the 2048 subcarriers may be represented as 0, 1, 2, ..., 2047. Therefore, indexes of 48 subcarriers indicated by $q_{sc}^{start}$ and $q_{sc}^{end}$ may be represented as $q_{sc}^{start}$ mod N, $(q_{sc}^{start}+1)$ mod N, $(q_{sc}^{start}+2)$ mod N, ..., $(q_{sc}^{start}+47)$ mod N.

It can be learned that if $t_{start}=0$, $t_{end}=(N+N_{cp}) \cdot T_s$, and $t_{offset}=-N_{cp} \cdot T_s$, a time length of the time-domain sending data s is $(N+N_{cp}) \cdot T_s$, where data of a start time length $N_{cp} \cdot T_s$ may be considered as a cyclic prefix of the time-domain sending data s. Remaining data whose length is $N \cdot T_s$ after the data of the start time length $N_{cp} \cdot T_s$ is removed may be considered as time-domain sending data with no cyclic prefix.

The time-domain sending data s(t) obtained by using the foregoing expression is a representation form with temporal continuity. It can be learned that, it is assumed that $t_{start}=0$, $t_{end}=(N+N_{cp}) \cdot T_s$, and $t_{offset}=-N_{cp} \cdot T_s$. When discrete sampling is performed on t by using $\tilde{n} \cdot T_s$, $\tilde{n}=0, 1, 2, \ldots, (N+N_{cp})-1$, the following discrete representation form may be obtained after discrete sampling is performed on the foregoing continuous representation form of the inverse Fourier transform:

$$s(\tilde{n} \cdot T_s) = \frac{1}{\sqrt{N_{scale}^{ifft}}} \sum_{q=q_{sc}^{start}}^{q_{sc}^{end}} d_{filter}(q-q_{sc}^{start}) e^{j2\pi \cdot (q+q_{re,offset}) \cdot (\tilde{n}-N_{ep})/N}.$$

Time-domain sending data $s(\tilde{n} \cdot T_s)$ in the foregoing discrete representation form includes $N+N_{cp}$ pieces of data, and first $N_{cp}$ pieces of data may be considered as a cyclic prefix.

In this application, the inverse Fourier transform may be inverse discrete Fourier transform (IDFT) or inverse fast Fourier transform (IFFT), or may be another form of inverse Fourier transform. This is not limited in this application.

Figure 9:
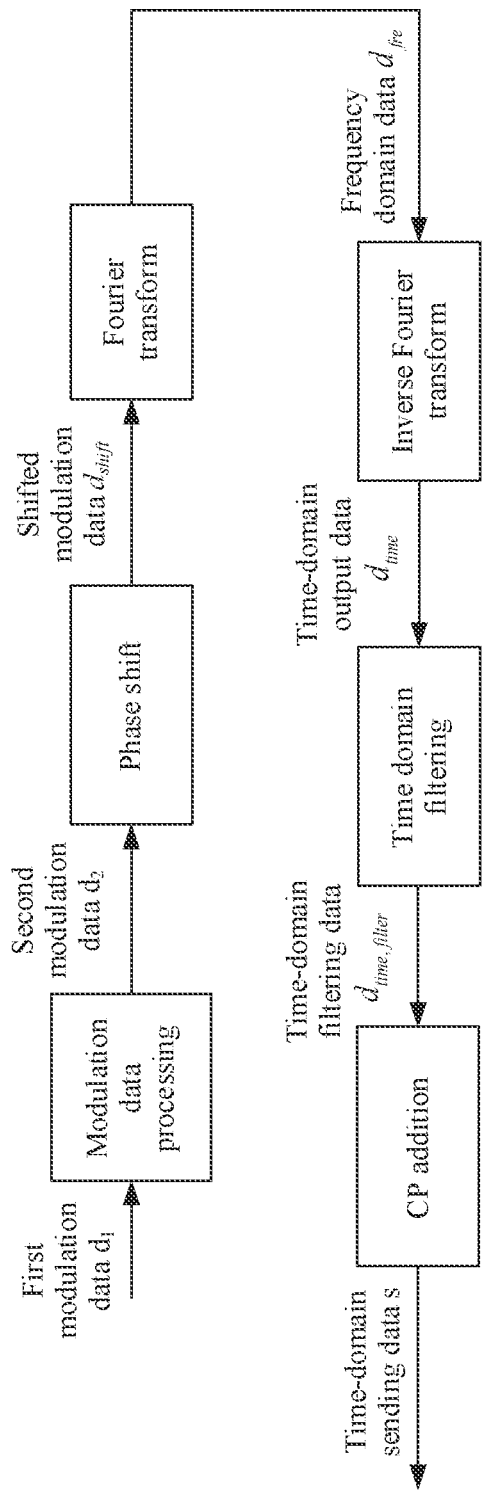
FIG. 9 is a schematic block diagram of a data transmission method according to this application.

For example, FIG. 9 is a schematic block diagram of another data transmission method. The data transmission method shown in FIG. 9 is implemented by using time domain filtering. Operations or steps such as phase shift, Fourier transform, inverse Fourier transform, time domain filtering, and CP addition in FIG. 9 are described below.

(1) Phase Shift (2) Fourier Transform

As shown in FIG. 9, after modulation data processing is performed on first modulation data $d_1$, second modulation data $M_2$ whose length is $d_2$ is obtained. After phase shift is performed on the second modulation data $d_2$, shifted modulation data $d_{shift}$ whose length is $M_2$ is obtained. $M_2$-point Fourier transform is performed on the shifted modulation data $d_{shift}$ whose length is $M_2$, to obtain frequency domain data $d_{fre}$ whose length is $M_2$.

For a phase shift operation and a Fourier transform operation, specifically refer to the foregoing descriptions of the phase shift and the Fourier transform in FIG. 8.

(3) Inverse Fourier Transform

As shown in FIG. 9, inverse Fourier transform is performed on output data of the Fourier transform, namely, the frequency domain data $d_{fre}$ whose length is $M_2$, to obtain time-domain output data $d_{time}$.

In a possible implementation, $$d_{time}(t) = \frac{1}{\sqrt{N_{scale}^{ifft}}} \sum_{q=q_{sc}^{start}}^{q_{sc}^{end}} d_{fre}(q-q_{sc}^{start}) e^{j2\pi \cdot \Delta f \cdot (q+q_{re,offset}) \cdot (t+t_{offset})}.$$

$d_{time}(t)$ is data at a $t^{th}$ moment in $d_{time}$, $t_{start} \leq t < t_{end}$, $t_{start}$, t, and $t_{end}$ each are a real number, and $t_{end}-t_{start}=N \cdot T_s$. For example, $t_{start}=0$ and $t_{end}=N \cdot T_s$. $t_{offset}$ is a delay offset, and $t_{offset}$ may be 0. It can be learned that, when $t_{end}-t_{start}=N \cdot T_s$, a time length of the time-domain output data $d_{time}$ is $N \cdot T_s$, in other words, there is no cyclic prefix. $q_{sc}^{end}-q_{sc}^{start}=M_2-1$, for example, $q_{sc}^{start}=-\lfloor M_2/2 \rfloor$ and $q_{sc}^{end}=\lceil M_2/2 \rceil-1$. For other parameters, refer to the foregoing descriptions of parameters involved in the inverse Fourier transform in FIG. 8.

(4) Time Domain Filtering

As shown in FIG. 9, time domain filtering may be performed on the time-domain output data $d_{time}$ whose length is $N \cdot T_s$, to obtain time-domain filtering data $d_{time,filter}$ whose length is $N \cdot T_s$.

Specifically, circular convolution may be performed on the time-domain output data $d_{time}$ and a time domain filter $s_{filter}$, to obtain the time-domain filtering data $d_{time,filter}$.

In a possible implementation, Fourier transform may be performed on the time domain filter $s_{filter}$ to obtain a frequency domain filter $S_{filter}$. For example, $s_{filter}(t)$ is data at a $t^{th}$ moment of the time domain filter $s_{filter}$, and a time length of the time domain filter $s_{filter}$ is $N_{filter} \cdot T_s$. Discrete sampling is performed on $s_{filter}$ by using $n' \cdot T_s$, $n'=0, 1, 2, \ldots, N_{filter}-1$, and then, the Fourier transform may be performed to obtain $S_{filter}$.

(5) CP Addition

As shown in FIG. 9, a CP is added to the time-domain filtering data $d_{time,filter}$ whose time length is $N \cdot T_s$, to obtain time-domain sending data s of one symbol.

Specifically, in a possible implementation, data that is at an end of $d_{time,filter}$ and whose time length is $N_{cp} \cdot T_s$ is copied to a start location of $d_{time,filter}$ as a cyclic prefix, to time-domain sending data whose time length is $(N+N_{cp}) \cdot T_s$.

It should be understood that a specific CP addition operation is not limited in this application. For details, refer to the current technology. This is not described herein.

Sending Preprocessing Manner 2

In addition to Fourier transform and inverse Fourier transform, the sending preprocessing may further include phase shift and data extraction. Further, the sending preprocessing may further include filtering. The filtering may be frequency domain filtering or time domain filtering.

Specifically, in an implementation, after sequentially performing the phase shift and the Fourier transform on the second modulation data, the terminal device obtains frequency domain data whose length is $M_2$. Then, the terminal device performs the data extraction on the frequency domain data to obtain extracted frequency domain data whose length is $M_1$, where the extracted frequency domain data is some elements in the frequency domain data. Finally, after performing the inverse Fourier transform on the extracted frequency domain data, the terminal device may obtain the time-domain sending data, or after sequentially performing the inverse Fourier transform and the CP addition on the extracted frequency domain data, the terminal device may obtain the time-domain sending data.

Alternatively, after obtaining the extracted frequency domain data, the terminal device may sequentially perform the frequency domain filtering and the inverse Fourier transform on the extracted frequency domain data to obtain the time-domain sending data. Alternatively, the terminal device performs CP addition processing after the inverse Fourier transform to obtain the time-domain sending data.

Alternatively, after obtaining the extracted frequency domain data, the terminal device may sequentially perform the inverse Fourier transform and the time domain filtering on the extracted frequency domain data to obtain the time-domain sending data. Alternatively, the terminal device performs CP addition processing after the time domain filtering to obtain the time-domain sending data.

It should be understood that, in the foregoing descriptions, locations of a data extraction operation and a frequency domain filtering operation may be exchanged.

The sending preprocessing manner 2 is described below in detail with reference to data transmission methods according to this application in FIG. 10 and FIG. 11.

Figure 10:
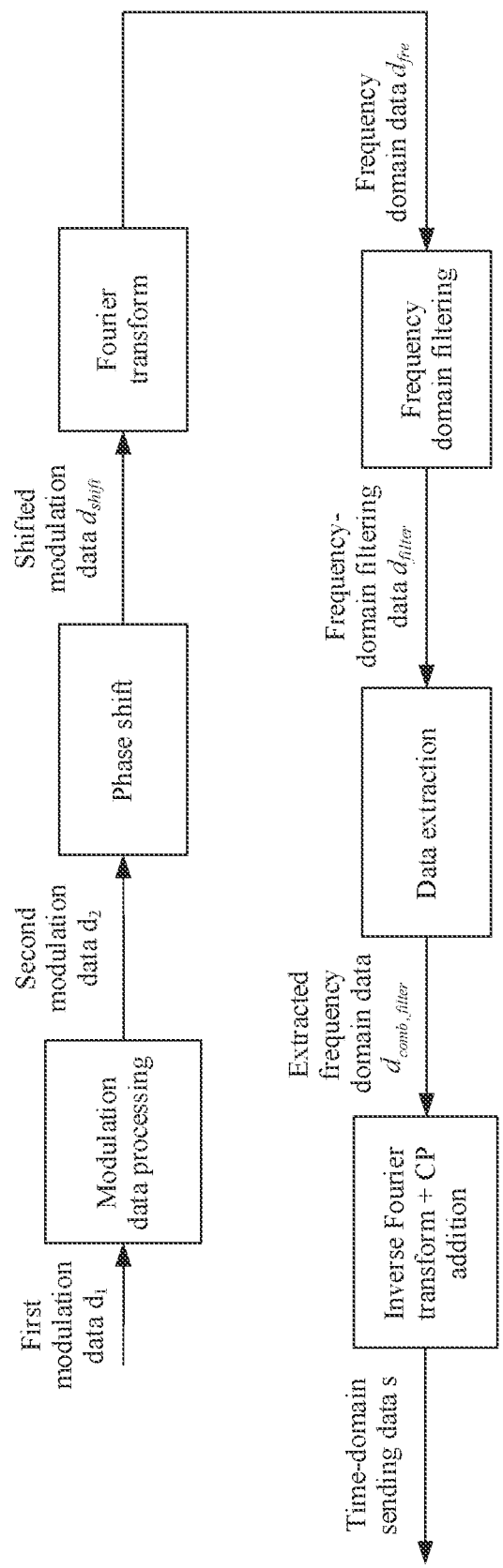
FIG. 10 is a schematic block diagram of a data transmission method according to this application.

FIG. 10 is a schematic block diagram of a data transmission method. The data transmission method shown in FIG. 10 is implemented by using frequency domain filtering. Operations or steps such as phase shift, Fourier transform, frequency domain filtering, data extraction, inverse Fourier transform, and CP addition in FIG. 10 are described below.

(1) Phase Shift (2) Fourier Transform

As shown in FIG. 10, after modulation data processing is performed on first modulation data $d_1$, second modulation data $d_2$ whose length is $M_2$ is obtained. After phase shift is performed on the second modulation data $d_2$, shifted modulation data $d_{shift}$ whose length is $M_2$ is obtained. $M_2$-point Fourier transform is performed on the shifted modulation data $d_{shift}$ whose length is $M_2$, to obtain frequency domain data $d_{fre}$ whose length is $M_2$.

For a phase shift operation and a Fourier transform operation, specifically refer to the foregoing descriptions of the phase shift and the Fourier transform in FIG. 8.

(3) Frequency Domain Filtering

As shown in FIG. 10, frequency domain filtering may be performed on the frequency domain data $d_{fre}$ whose length is $M_2$, to obtain frequency-domain filtering data $d_{filter}$ whose length is $M_2$.

Specifically, an $h^{th}$ piece of data $d_{fre}(h)$ in the frequency-domain data $d_{fre}$ is multiplied by a frequency domain filter coefficient $S_{filter}(h)$ element by element, to obtain an $h^{th}$ piece of data $d_{filter}(h)$ in the frequency-domain filtering data $d_{filter}$. In other words, $d_{filter}(h)=d_{fre}(h)\cdot S_{filter}(h)$, $h=0, 1, 2, \ldots, M_2-1$.

$S_{filter}(h)$ is an $h^{th}$ coefficient in a frequency domain filter whose length is $M_2$.

It should be noted that when all filter coefficients are 1, the frequency domain data $d_{fre}$ and the frequency-domain filtering data $d_{filter}$ are consistent, and frequency domain filtering does not need to be performed or it is equivalent to that no frequency domain filtering operation is performed.

(4) Data Extraction

As shown in FIG. 10, data extraction is performed on the frequency-domain filtering data $d_{filter}$, to extract $M_1$ ($M_2=K\cdot M_1$) pieces of frequency domain data from $d_{filter}$, so that extracted frequency domain data $d_{comb,filter}$ can be obtained.

Optionally, a location $I_{k'}$, in the frequency-domain filtering data $d_{filter}$, of the extracted frequency domain data $d_{comb,filter}$ whose length is $M_1$ may be determined by K. The extracted frequency domain data $d_{comb,filter}$ may be represented by an expression:

$$d_{comb,filter}(k')=d_{filter}(I_{k'}), k'=0, 1, 2, \ldots M_1-1.$$

For example, when a phase factor of the phase shift is $e^{j\pi\times m_2/2}$, the location $I_{k'}$ may be $(K\times M_1/4) \bmod K+k'\times K$, and when the phase factor of the phase shift is $e^{-j\pi\times m_2/2}$, the location $I_{k'}$ may be $(-K\times M_1/4) \bmod K+k'\times K$.

For example, when the phase factor of the phase shift is $e^{j\pi\times m_2/2}$, the extracted frequency domain data $d_{comb,filter}$ may be represented as:

$$d_{comb,filter}(k')=d_{fre}((K\times M_1/4)\bmod K+k'\times K)\cdot S_{filter}((K\times M_1/4)\bmod K+k'\times K).$$

For example, it is assumed that the length $M_1$ of the first modulation data is 3, a value of K is 4, and the phase factor of the phase shift is $e^{j\pi\times m_2/2}$. In this case, the location $I_{k'}$ of the extracted frequency domain data $d_{comb,filter}$ in the frequency-domain filtering data $d_{filter}$ is $I_{k'}=[3, 7, 11]$.

It should be noted that a quantity of subcarriers corresponding to data allocation bandwidth is consistent with an amount of data included in the extracted frequency domain data $d_{comb,filter}$. To be specific, the quantity of subcarriers corresponding to the data allocation bandwidth is the length $M_1$ of the first modulation data.

(5) Inverse Fourier Transform and CP Addition

As shown in FIG. 10, inverse Fourier transform and CP addition are performed on the extracted frequency-domain filtering data $d_{comb,filter}$ whose length is $M_1$, to convert the extracted frequency domain data $d_{comb,filter}$ into time-domain sending data of one symbol.

Specifically, for an inverse Fourier transform operation and a CP addition operation, refer to the foregoing descriptions of the inverse Fourier transform operation and the CP addition operation in FIG. 8. Compared with that input data of the inverse Fourier transform in FIG. 8 is the frequency-domain filtering data $d_{filter}$ whose length is $M_2$, input data of the inverse Fourier transform herein is the extracted frequency domain data $d_{comb,filter}$ whose length is $M_1$. Correspondingly, $q_{sc}^{start}$ is an index of a start location of a frequency domain resource to which the filtering data $d_{filter}$ is mapped, $q_{sc}^{end}$ is an index of an end location of the frequency domain resource to which the filtering data $d_{filter}$ is mapped, and $q_{sc}^{end}-q_{sc}^{start}=M_1-1$. For example, $q_{sc}^{start}=-\lfloor M_1/2 \rfloor$ and $q_{sc}^{end}=\lceil M_1/2 \rceil-1$.

Figure 11:
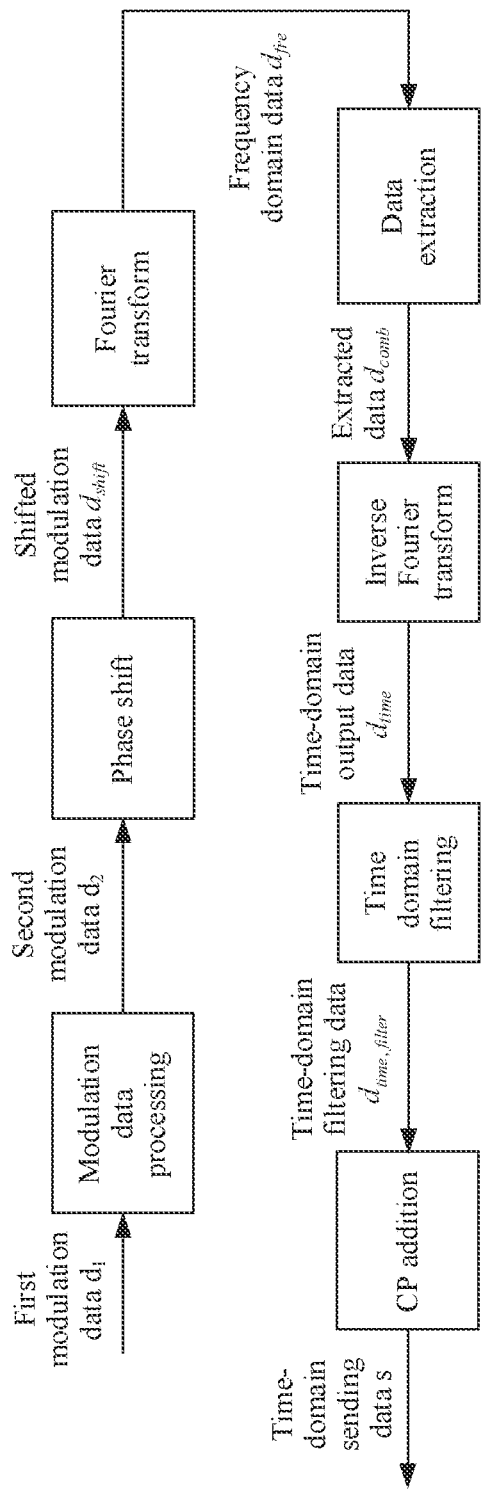
FIG. 11 is a schematic block diagram of a data transmission method according to this application.

FIG. 11 is a schematic block diagram of a data transmission method. The data transmission method shown in FIG. 11 is implemented by using time domain filtering. Operations or steps such as phase shift, Fourier transform, data extraction, inverse Fourier transform, time domain filtering, and CP addition in FIG. 11 are described below.

(1) Phase Shift (2) Fourier Transform

As shown in FIG. 11, after modulation data processing is performed on first modulation data $d_1$, second modulation data $d_2$ whose length is $M_2$ is obtained. After phase shift is performed on the second modulation data $d_2$, shifted modulation data $d_{shift}$ whose length is $M_2$ is obtained. $M_2$-point Fourier transform is performed on the shifted modulation data $d_{shift}$ whose length is $M_2$, to obtain frequency domain data $d_{fre}$ whose length is $M_2$.

For a phase shift operation and a Fourier transform operation, specifically refer to the foregoing descriptions of the phase shift and the Fourier transform in FIG. 8.

(3) Data Extraction

As shown in FIG. 11, data extraction is performed on output data of the Fourier transform, namely, the frequency domain data $d_{fre}$ whose length is $M_2$, to extract $M_1$ ($M_2=K \cdot M_1$) pieces of frequency domain data from $d_{fre}$, so that extracted data $d_{comb}$ can be obtained.

Optionally, a location $I_{k'}$ in the frequency domain data $d_{fre}$ of the extracted data $d_{comb}$ whose length is $M_1$ may be determined by K. The extracted data $d_{comb}$ may be represented by an expression:

$$d_{comb}(k') = d_{fre}(I_{k'}), k'=0, 1, 2, \ldots, M_1-1, \text{ where}$$

$d_{comb}(k')$ is a $k'^{th}$ piece of data in $d_{comb}$.

For example, when a phase factor of the phase shift is $e^{j\pi \times m_2/2}$, the location $I_{k'}$ may be $(K \times M_1/4) \bmod K + k' \times K$, and when the phase factor of the phase shift is $e^{-j\pi \times m_2/2}$, the location $I_{k'}$ may be $(-K \times M_1/4) \bmod K + k' \times K$.

(4) Inverse Fourier Transform

As shown in FIG. 11, inverse Fourier transform may be performed on the extracted data $d_{comb}$ whose length is $M_1$, to obtain time-domain output data $d_{time}$.

A possible implementation is:

$$d_{time}(t) = \frac{1}{\sqrt{N_{scale}^{ifft}}} \sum_{q=q_{sc}^{start}}^{q_{sc}^{end}} d_{comb}(q - q_{sc}^{start}) e^{j2\pi \cdot \Delta f \cdot (q+q_{re,offset})(t+t_{offset})}.$$

$d_{time}(t)$ is data at a $t^{th}$ moment in $d_{time}$, $t_{start} \leq t < t_{end}$, $t_{start}$, $t$, and $t_{end}$ each are a real number, and $t_{end}-t_{start}=N \cdot T_s$. For example, $t_{start}=0$ and $t_{end}=N \cdot T_s$. $t_{offset}$ is a delay offset, and $t_{offset}$ may be 0. It can be learned that, when $t_{end}-t_{start}=N \cdot T_s$, a time length of the time-domain output data $d_{time}$ is $N \cdot T_s$, in other words, there is no cyclic prefix. $k_{sc}^{end}-k_{sc}^{start}=M_1-1$, for example, $k_{sc}^{start}=-\lfloor M_1/2 \rfloor$ and $k_{sc}^{end}=\lceil M_1/2 \rceil - 1$. For other parameters, refer to the foregoing descriptions of parameters involved in the inverse Fourier transform in FIG. 8.

(5) Time Domain Filtering

As shown in FIG. 11, time domain filtering may be performed on the time-domain output data $d_{time}$ whose length is $N \cdot T_s$, to obtain time-domain filtering data $d_{time,filter}$ whose length is $N \cdot T_s$.

Specifically, circular convolution may be performed on the time-domain output data $d_{time}$ and a time domain filter $s_{filter}$, to obtain the time-domain filtering data $d_{time,filter}$.

In a possible implementation, Fourier transform may be performed on a time domain filter $s_{filter}$ to obtain a frequency domain filter $S_{filter}$. For example, $s_{filter}(t)$ is data at a $t^{th}$ moment of the time domain filter $s_{filter}$, and a time length of the time domain filter $s_{filter}$ is $N_{filter} \cdot T_s$. Discrete sampling is performed on $s_{filter}$ by using $n' \cdot T_s$, $n'=0, 1, 2, \ldots, N_{filter}-1$, and then, the Fourier transform may be performed to obtain $S_{filter}$.

(6) CP Addition

A CP is added to the time-domain filtering data $d_{time,filter}$ whose time length is $N \cdot T_s$, to obtain time-domain sending data s of one symbol.

In a possible implementation, data that is at an end of $d_{time,filter}$ and whose time length is $N_{sc} \cdot T_s$ is copied to a start location of $d_{time,filter}$ as a cyclic prefix, to time-domain sending data whose time length is $(N+N_{cp}) \cdot T_s$.

In conclusion, the time-domain sending data may be obtained by processing the second modulation data in the sending preprocessing manner 1 or the sending preprocessing manner 2.

Figure 12:
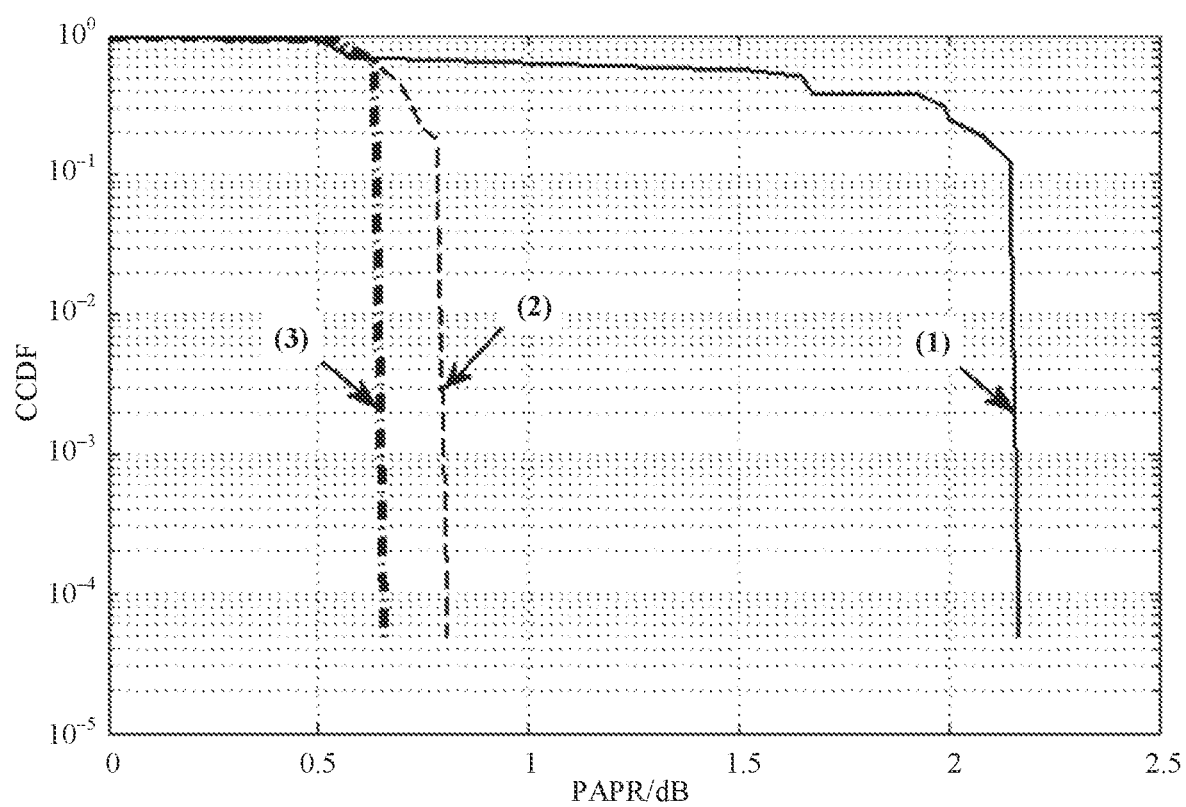
FIG. 12 is a simulation diagram of a PAPR of time-domain sending data obtained based on a data transmission method in this application.

FIG. 12 is a simulation diagram of a PAPR of time-domain sending data obtained based on a data transmission method according to an embodiment of this application.

Specifically, as shown in FIG. 12, a horizontal axis represents a PAPR of time-domain sending data, and a vertical axis represents a complementary cumulative distribution function (CCDF). A curve (1) is a PAPR of time-domain sending data obtained after an SC-FDMA waveform is generated from Pi/2-BPSK modulation data whose length is 6 (in other words, $M_1=6$) based on the method shown in FIG. 3 and a frequency domain filtering operation is introduced at the same time. A curve (2) is a PAPR of time-domain sending data obtained after the modulation data processing manner 1 is used for first modulation data for which $M_1=6$ and that is obtained through BPSK modulation based on the method provided in this application and frequency domain filtering is used at the same time, where K=2 (in other words, $M_2=12$). A curve (3) is a PAPR of time-domain sending data obtained after the modulation data processing manner 1 is used for first modulation data for which $M_1=6$ and that is obtained through BPSK modulation based on the method provided in this application and frequency domain filtering is used at the same time, where K=4 (in other words, $M_2=24$).

It can be learned from FIG. 12 that, when $M_1=6$ and K=2, based on the method provided in this application, a PAPR of the time-domain sending data is approximately 0.8 dB; when $M_1=6$ and K=4, based on the method provided in this application, a PAPR of the time-domain sending data is approximately 0.7 dB; and when $M_1=6$, based on the method provided in FIG. 3, a PAPR of the time-domain sending data is approximately 2.2 dB. In other words, when $M_1=6$ and K=2, compared with the method provided in FIG. 3, in the method provided in this application, a gain of the PAPR of the time-domain sending data is approximately 1.4 dB; and when $M_1=6$ and K=4, compared with the method provided in FIG. 3, in the method provided in this application, a gain of the PAPR of the time-domain sending data is approximately 1.5 dB.

In conclusion, based on the data transmission method provided in this application, after the first modulation data changes into the second modulation data of a longer length, some modulation data in the second modulation data is related to each other, and is not entirely random. In addition, because a Fourier transform operation and an inverse Fourier transform operation are performed on the time-domain sending data of one symbol that is obtained from the second modulation data, the time-domain sending data may be approximately obtained by performing oversampling and then superposition on the second modulation data; and because some modulation data in the second modulation data is related to each other, a probability of random superposition of the second modulation data during oversampling and superposition is reduced, and a probability of forward superposition is also reduced, thereby reducing a PAPR. In short, there is also specific correlation between some data in the time-domain sending data of one symbol that is obtained based on the second modulation data. Based on the correlation, the PAPR can be further reduced.

In addition, it can be learned from the simulation diagram in FIG. 12 that, in the data transmission method provided in this application, the PAPR of the time-domain sending data can be reduced to less than 2 dB. In other words, compared with the data transmission method shown in FIG. 3, the data transmission method provided in this application can further reduce the PAPR of the time-domain sending data.

In addition, the data transmission method provided in this application may be applied to first modulation data of any length, and is not limited to first modulation data of an even length.

FIG. 13 is a schematic flowchart of a data transmission method 500. As shown in the figure, the method 500 shown in FIG. 13 may include S510 to S530. Steps in the method 500 are described below in detail with reference to FIG. 13.

S510: A terminal device sequentially performs first phase shift and Fourier transform on first modulation data $d_1$ whose length is $M_1$, to obtain frequency domain data $d_{fre}$ whose length is $M_1$.

S520: The terminal device performs cyclic extension on the frequency domain data $d_{fre}$ to obtain extended data $d_{extension}$ whose length is $M_2$, where $M_1 < M_2$, and $M_1$ and $M_2$ each are a positive integer.

The length of the first modulation data $d_1$ is $M_1$, in other words, the first modulation data $d_1$ includes $M_1$ pieces of modulation data. $d_1(m_1)$ is an $m_1^{th}$ ($m_1=0, 1, 2, \ldots, M_1-1$) element in the first modulation data $d_1$, namely, an $m_1^{th}$ piece of modulation data.

For a specific modulation manner for obtaining the first modulation data, specifically refer to the foregoing descriptions of the first modulation data in S410. Details are not described herein again.

Specifically, the first phase shift is sequentially performed on the first modulation data $d_1$, to obtain shifted modulation data $d_{shift}$, where $d_{shift}(m_1)$ is an $m_1^{th}$ piece of data in the shifted modulation data. A first phase shift operation may be multiplying the $m_1^{th}$ piece of data in the first modulation data by a corresponding phase factor $e^{j\cdot\varphi_{m1}}$. Therefore, the shifted modulation data may be represented as:

$$d_{shift}(m_1)=d_1(m_1)\cdot e^{j\cdot\varphi_{m1}}, m_1=0, 1, 2, \ldots, M-1.$$

Optionally, a phase factor of the first phase shift may be determined by K, where $K=M_2/M_1$. In other words, when $M_2=K\cdot M_1$, the phase factor of the first phase shift may be determined by K.

For example, a value of the phase factor $e^{j\cdot\varphi_{m1}}$ of the first phase shift may be $e^{j\alpha\times K\times m_1}$, and $\alpha$ may be $\pi/2$ or $-\pi/2$. The phase factor of the first phase shift may be further related to a symbol index. This is not limited in this application. For example, if an index of a symbol on which the first modulation data is located is represented as l, the value of the phase factor $e^{j\cdot\varphi_{m1}}$ of the first phase shift may be alternatively $e^{j\alpha\times(K\times m_1+l)}$.

Optionally, $M_1$-point Fourier transform is performed on the shifted modulation data $d_{shift}$ whose length is $M_1$ to obtain the frequency domain data $d_{fre}$ whose length is $M_1$. A possible implementation is:

$$d_{fre}(q) = \frac{1}{\sqrt{M_{scale}^{fft}}} \sum_{m_1=0}^{M_1-1} d_{shift}(m_1)e^{-j2\pi\times q\times m_1/M_1},$$

$q=0, 1, 2, \ldots, M_1-1$, where $M_{scale}^{fft}$ is a coefficient used to adjust power of output data obtained after the Fourier transform, and $M_{scale}^{fft}$ is a real number, for example, $M_{scale}^{fft}=M_1$. $d_{fre}(q)$ is a $q^{th}$ piece of data in $d_{fre}$.

The cyclic extension is performed on the frequency domain data $d_{fre}$ whose length is $M_1$, to obtain extended data $d_{extension}$ whose length is $M_2$. The extended data may be expressed by using an expression:

$$d_{extension}(k')=d_{fre}(k' \bmod M_1), k'=0, 1, 2, \ldots M_2-1.$$

$d_{extension}(k')$ is a $k'^{th}$ piece of data in $d_{extension}$. $M_2=K\cdot M_1$. In this case, it can be learned that a cyclic extension operation is equivalent to repeating the frequency domain data $d_{fre}$ whose length is $M_1$ K times, to obtain the extended data $d_{extension}$.

S530: The terminal device performs second phase shift on the extended data $d_{extension}$ to obtain frequency-domain shifted data $d_{fre,shift}$.

Specifically, a second phase shift operation may be multiplying a $k'^{th}$ piece of data $d_{extension}(k')$ in the extended data $d_{extension}$ by a phase factor $e^{j\theta_{k'}}$ of the second phase shift. In other words:

$$d_{fre,shift}(k')=d_{extension}(k')\cdot e^{j\theta_{k'}}, k'=0, 1, 2, \ldots, M_2-1.$$

Optionally, the phase factor of the second phase shift may be determined by K and $M_2$.

In a possible implementation, the phase factor of the second phase shift is:

$$e^{j\theta_{k'}} = \sum_{k_0=0}^{K-1} e^{j\times\alpha\times k_0} \cdot e^{\frac{-j2\pi\times k'\times k_0}{M_2}}.$$

It should be understood that the foregoing cyclic extension operation and the second phase shift operation may be performed together. In this case, the frequency-domain shifted data $d_{fre,shift}$ may be represented as:

$$d_{fre,shift}(k')=d_{fre}(k'\bmod M_1)\cdot e^{j\theta_{k'}}, k'=0, 1, 2, \ldots, M_2-1.$$

S540: The terminal device performs sending preprocessing on the frequency-domain shifted data $d_{fre,shift}$ to obtain time-domain sending data of one symbol, where the sending preprocessing includes inverse Fourier transform.

After performing the sending preprocessing on the frequency-domain shifted data, the terminal device may obtain an SC-FDMA symbol.

S550: The terminal device sends the time-domain sending data on the one symbol.

Based on the data transmission method provided in this application, a first phase shift operation, a Fourier transform operation, and a cyclic extension operation are performed on the first modulation data, so that the extended data of a longer length can be obtained. Because some modulation data in the extended data is related to each other, and is not entirely random, there is specific correlation between some data in the time-domain sending data of one symbol that is obtained based on the extended data. Based on the correlation, a PAPR can be further reduced.

In addition, the data transmission method shown in FIG. 13 may be equivalent to an equivalent solution in which a modulation data processing method 1 is used for the modulation data processing operation in the method shown in FIG. 4. Therefore, it can be learned from the simulation diagram shown in FIG. 12 that, in the data transmission method shown in FIG. 13, a PAPR of the time-domain sending data can be reduced to less than 2 dB. In other words, compared with the data transmission method shown in FIG. 3, the data transmission method provided in this application can further reduce the PAPR of the time-domain sending data.

In addition, the data transmission method provided in this application may be applied to first modulation data of any length, and is not limited to first modulation data of an even length.

Optionally, in an embodiment of this application, the sending preprocessing may further include frequency domain filtering or time domain filtering. Further, the sending preprocessing may further include a CP addition operation.

When filtering is frequency domain filtering, after obtaining the frequency-domain shifted data $d_{fre,shift}$ in S530, the terminal device performs the frequency domain filtering on the frequency-domain shifted data $d_{fre,shift}$ to obtain frequency-domain filtering data $d_{filter}$ whose length is $M_2$, and then the terminal device may perform inverse Fourier transform on the frequency-domain filtering data $d_{filter}$ to obtain the time-domain sending data. Alternatively, the terminal device may perform a CP addition operation after the inverse Fourier transform to obtain the time-domain sending data.

For how to perform frequency domain filtering on the frequency-domain shifted data $d_{fre,shift}$ refer to the foregoing descriptions of frequency domain filtering in FIG. 8. Herein, only input data of the frequency domain filtering, namely, frequency-domain data $d_{fre}$, in FIG. 8 is replaced with the frequency-domain shifted data $d_{fre,shift}$.

For how the terminal device performs the inverse Fourier transform on the frequency-domain filtering data $d_{filter}$, or performs an inverse Fourier transform operation and a CP addition operation on the frequency-domain filtering data $d_{filter}$ to obtain the time-domain sending data, refer to the foregoing descriptions of the inverse Fourier transform operation and the CP addition operation in FIG. 8. Details are not described herein again.

When filtering is time domain filtering, after obtaining the frequency-domain shifted data $d_{fre,shift}$ in S530, the terminal device may perform inverse Fourier transform on the frequency-domain shifted data $d_{fre,shift}$ to obtain time-domain output data $d_{time}$, and then the terminal device may perform time domain filtering on the time-domain output data $d_{time}$ to obtain the time-domain sending data. Alternatively, the terminal device performs a CP addition operation after the time domain filtering to obtain the time-domain sending data.

The inverse Fourier transform is performed on the frequency-domain shifted data $d_{fre,shift}$ to obtain the time-domain output data $d_{time}$. A possible implementation is:

$$d_{time}(t) = \frac{1}{\sqrt{N_{scale}^{ifft}}} \sum_{q=q_{sc}^{start}}^{q_{sc}^{end}} d_{fre,shift}(q - q_{sc}^{start})e^{j2\pi \cdot \Delta f \cdot (q+q_{re,offset})\cdot(t+t_{offset})}.$$

$d_{time}(t)$ is data at a $t^{th}$ moment in $d_{time}$, $t_{start} \leq t < t_{end}$, $t_{start}$, t, and $t_{end}$ each are a real number, and $t_{end}-t_{start}=N\cdot T_s$. For example, $t_{start}=0$ and $t_{end}=N\cdot T_s$. $t_{offset}$ is a delay offset, and $t_{offset}$ may be 0. It can be learned that, when $t_{end}-t_{start}=N\cdot T_s$, a time length of the time-domain output data $d_{time}$ is $N\cdot T_s$, in other words, there is no cyclic prefix. $k_{sc}^{end}-k_{sc}^{start}=M-1$, for example, $k_{sc}^{start}=-\lfloor M_2/2 \rfloor$ and $k_{sc}^{end}=\lceil M_2/2 \rceil-1$. For other parameters, refer to the foregoing descriptions of parameters involved in the inverse Fourier transform in FIG. 8.

For how the terminal device performs the time domain filtering on the time-domain output data $d_{time}$ whose time length is $N\cdot T_s$, or performs a time domain filtering operation and a CP addition operation on the time-domain output data $d_{time}$ to obtain the time-domain sending data, refer to the foregoing descriptions of the time domain filtering operation and the CP addition operation in FIG. 9. Details are not described herein again.

In the solutions described above, first modulation data corresponding to only one symbol is used as an example to describe how to perform various processing on the first modulation data to obtain the time-domain sending data for sending. A person skilled in the art may understand that, for modulation data corresponding to any other symbol, various processing similar to that performed on the first modulation data may also be performed on the modulation data, to obtain time-domain sending data with a relatively low PAPR. For example, a terminal device side may simultaneously transmit, by using the data transmission method shown in FIG. 4, modulation data corresponding to to-be-sent data and modulation data corresponding to a DMRS.

Operations on the terminal device side are mainly described above with reference to FIG. 4 to FIG. 13. A person skilled in the art may understand that, after performing an operation opposite to that on the terminal device side, a network device side may obtain demodulated first modulation data. For example, when the operation on the terminal device side is IFFT, an opposite operation on the network device side is FFT. A receiving operation on the network device side is briefly described below by using an example in which the data transmission method shown in FIG. 8 is used on the terminal device side.

Figure 14:
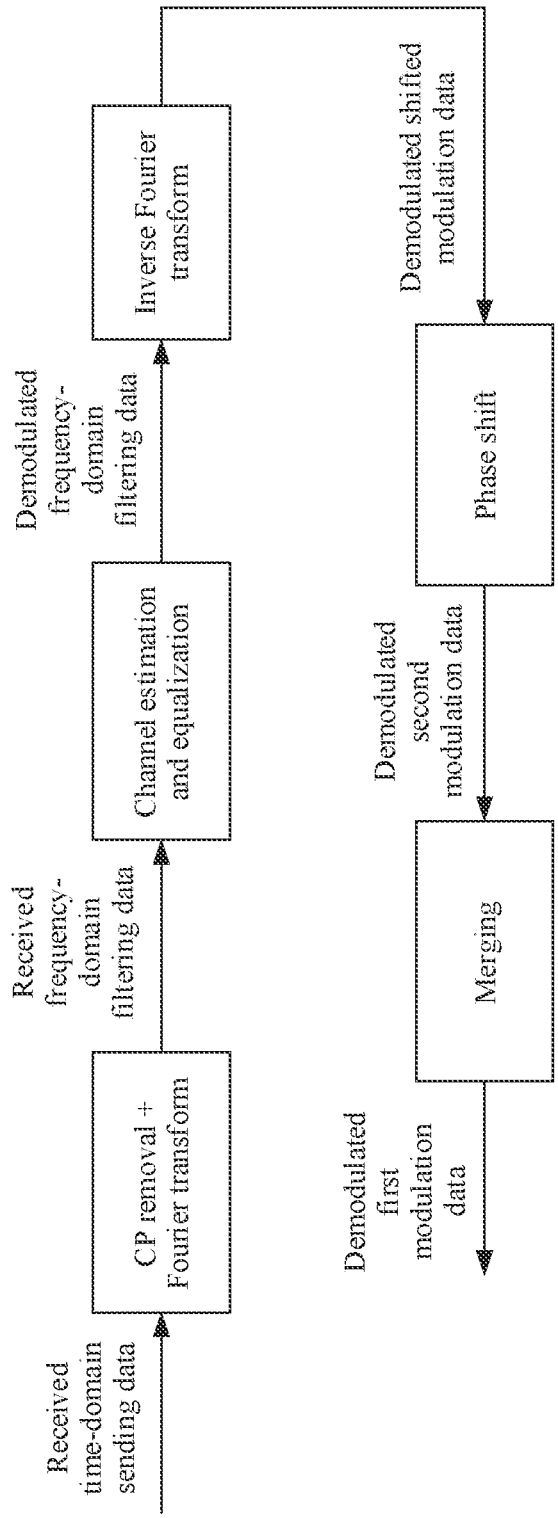
FIG. 14 is a schematic flowchart of another data transmission method according to this application.

As shown in FIG. 14, this application further provides a data transmission method. The method may be applied to a receive end. Herein, a network device is used as an example of the receive end for brief description.

Step 1: CP Removal and Fourier Transform

A network device removes a CP from received time-domain sending data and performs a Fourier transform operation, to obtain received frequency-domain filtering data whose length is $M_2$.

It should be understood that the received time-domain sending data corresponds to time-domain sending data s. In other words, after the time-domain sending data s passes through a radio link, the received time-domain sending data arrives at a network device side.

Step 2: Channel Estimation and Equalization

Specifically, after obtaining the received time-domain sending data and a demodulation reference signal (DMRS), the network device performs channel estimation by using the DMRS to obtain a channel response of a symbol on which the DMRS is located, and then may obtain, in a manner such as interpolation, direct assignment, or the like by using the channel response of the symbol on which the DMRS is located, a channel response of a symbol on which the data is located. The DMRS may be a DMRS transmitted by using the solution provided in this application, or may be a DMRS transmitted in the current technology. When the DMRS is the DMRS in this solution, equalization is performed by using the received frequency-domain filtering data and the channel response of the symbol on which the data is located, to obtain demodulated frequency-domain filtering data whose length is $M_2$.

Step 3: Inverse Fourier Transform

The network device performs inverse Fourier transform on the demodulated frequency-domain filtering data whose length is $M_2$, to obtain demodulated shifted modulation data whose length is $M_2$.

Step 4: Phase Shift

After obtaining the demodulated shifted modulation data whose length is $M_2$, the network device performs phase shift by using a phase factor $e^{-j\varphi_{m2}}$, to obtain demodulated second modulation data whose length is $M_2$.

Step 5: Merging

The network device may merge the demodulated second modulation data whose length is $M_2$, to obtain demodulated first modulation data whose length is $M_1$.

A merging operation is an operation opposite to modulation data processing. A person skilled in the art can easily understand how to merge the demodulated second modulation data whose length is $M_2$ based on the modulation data processing operation described above. For example, a transmit end obtains the second modulated data by using the modulation data processing manner 1 for the first modulation data, and the merging operation is adding consecutive K pieces of repeated modulated data in the demodulated second modulation data whose length is $M_2$. For example, it is assumed that a length of the first modulation data is 3 and a value of K is 4, the merging operation is adding $0^{th}$, first, second, and third pieces of data in demodulated second modulation data whose length is 12 to obtain a $0^{th}$ piece of data in demodulated first modulation data whose length is 3; adding fourth, fifth, sixth, and seventh pieces of data in the demodulated second modulation data whose length is 12 to obtain a first piece of data in the demodulated first modulation data whose length is 3; and adding eighth, ninth, tenth, and eleventh pieces of data in the demodulated second modulation data whose length is 12 to obtain a second piece of data in the demodulated first modulation data whose length is 3.

After the merging step, the network device may perform an operation such as decoding on the demodulated first modulation data, to obtain bit data sent by the transmit end.

As described above, a PAPR of the first modulation data is relatively low. Therefore, the network device has better demodulation performance for the first modulation data.

In the foregoing embodiments provided in this application, the methods provided in the embodiments of this application are separately described from perspectives of the transmit end (for example, the terminal device) and the receive end (for example, the network device). To implement functions in the methods provided in the foregoing embodiments of this application, the transmit end and the receive end may include a hardware structure and/or a software module, and the foregoing functions are implemented in a form of a hardware structure, a software module, or a hardware structure and a software module. Whether a function in the foregoing functions is performed in a manner of a hardware structure, a software module, or a hardware structure and a software module depends on a specific application and a design constraint condition of the technical solutions.

Figure 15:
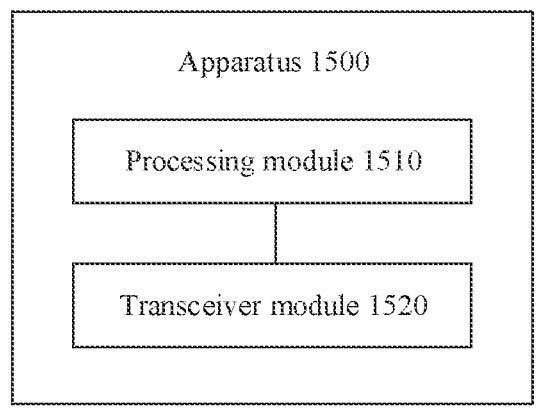
FIG. 15 is a schematic block diagram of an apparatus according to an embodiment of this application.

FIG. 15 is a schematic block diagram of an apparatus 1500 according to an embodiment of this application. The apparatus 1500 may be a transmit end, or may be an apparatus at a transmit end, or may be another apparatus (for example, a chip) that can implement a function of the transmit end. The transmit end may be a terminal device or a network device.

As shown in FIG. 15, the apparatus 1500 may include a processing module 1510 and a transceiver module 1520.

For example, the apparatus 1500 may be configured to implement the data transmission method shown in FIG. 4.

Specifically, the processing module 1510 is configured to: perform modulation data processing on first modulation data whose length is $M_1$, to obtain second modulation data whose length is $M_2$, where $M_1 < M_2$, $M_1$ and $M_2$ each are a positive integer, and any modulation data in the second modulation data is an element in the first modulation data; and perform sending preprocessing on the second modulation data to obtain time-domain sending data of one symbol, where the sending preprocessing includes Fourier transform and inverse Fourier transform.

The transceiver module 1520 is configured to send the time-domain sending data on the one symbol.

It should be understood that a specific process in which the foregoing modules perform corresponding steps in the method shown in FIG. 4 has been described in detail in the foregoing method embodiments. For brevity, details are not described herein again.

For another example, the apparatus 1500 may be configured to implement the data transmission method shown in FIG. 13.

Specifically, the processing module 1510 is configured to: sequentially perform first phase shift and Fourier transform on first modulation data whose length is $M_1$, to obtain frequency domain data whose length is $M_1$; perform cyclic extension on the frequency domain data to obtain extended data whose length is $M_2$, where $M_1 < M_2$, and $M_1$ and $M_2$ each are a positive integer; perform second phase shift on the extended data to obtain frequency-domain shifted data; and perform sending preprocessing on the frequency-domain shifted data to obtain time-domain sending data of one symbol, where the sending preprocessing includes inverse Fourier transform.

The transceiver module 1520 is configured to send the time-domain sending data on the one symbol.

It should be understood that a specific process in which the foregoing modules perform corresponding steps in the method shown in FIG. 13 has been described in detail in the foregoing method embodiments. For brevity, details are not described herein again.

It should be understood that module division in this embodiment of this application is an example, and is merely logical function division. In actual implementation, there may be another division manner. In addition, functional modules in the embodiments of this application may be integrated into one processor, or may exist alone physically, or two or more modules may be integrated into one module. The integrated module may be implemented in a form of hardware, or may be implemented in a form of a software functional module.

Figure 16:
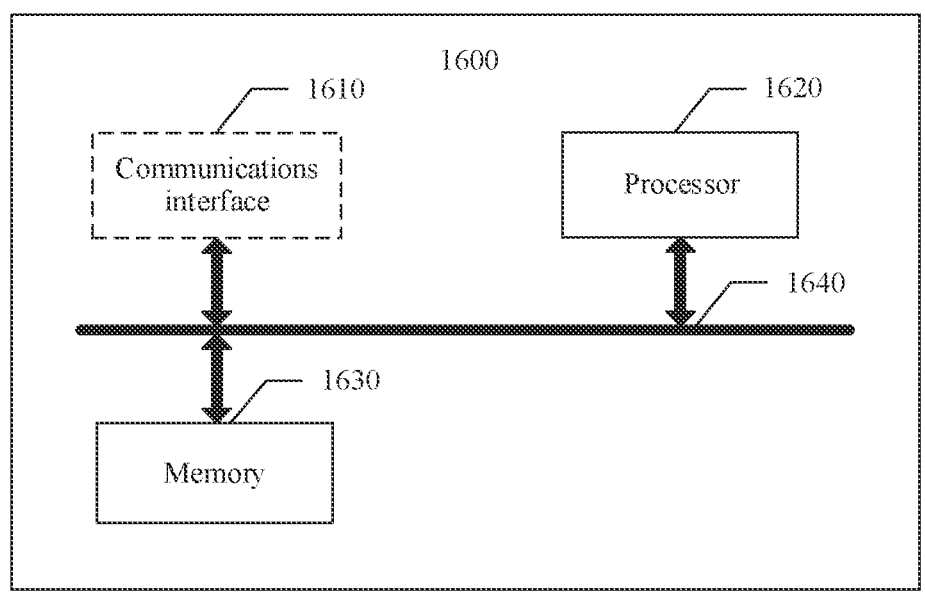
FIG. 16 is a schematic block diagram of another apparatus according to an embodiment of this application.

FIG. 16 is a schematic block diagram of an apparatus 1600 according to an embodiment of this application. The apparatus 1600 may be configured to implement functions of a transmit end, for example, the terminal device in the foregoing methods. The apparatus may be a transmit end, or may be an apparatus at a transmit end, or may be another apparatus that can implement a function of the transmit end, for example, a chip system. In this application, the chip system may include a chip, or may include a chip and another discrete device.

As shown in FIG. 16, the apparatus 1600 may include at least one processor 1620, configured to implement a function of the transmit end in the methods provided in the embodiments of this application, for example, implement a function performed by the terminal device in the method shown in FIG. 4 or FIG. 13. For details, refer to detailed descriptions in the method example. Details are not described herein again.

The apparatus 1600 may further include at least one memory 1630, configured to store program instructions and/or data. The memory 1630 is coupled to the processor 1620. Coupling in this embodiment of this application is indirect coupling or a communication connection between apparatuses, units, or modules, and may be in an electrical, mechanical, or another form, and is used for information exchange between apparatuses, units, or modules. The processor 1620 may cooperate with the memory 1630. The processor 1620 may execute the program instructions stored in the memory 1630. At least one of the at least one memory may be included in the processor.

The apparatus 1600 may further include a communications interface 1610, configured to communicate with another device by using a transmission medium, so that an apparatus used in the apparatus 1600 may communicate with another device. For example, when the apparatus is a terminal device, the another device may be a terminal device or a network device. The processor 1620 sends and receives data through the communications interface 1610, and is configured to implement functions performed by the terminal device in the method shown in FIG. 4 or FIG. 13. Optionally, the communications interface 1610 may be a transceiver, a circuit, a bus, a bus interface, or another apparatus that can implement a communication function. This is not limited in this application.

A specific connection medium between the communications interface 1610, the processor 1620, and the memory 1630 is not limited in this embodiment of this application. In this embodiment of this application, in FIG. 16, the memory 1630, the processor 1620, and the transceiver 1610 are connected by using the bus 1640. The bus is represented by a bold line in FIG. 16. A connection manner between other components is merely a schematic description, and is not limited thereto. The bus may be classified into an address bus, a data bus, a control bus, and the like. For ease of representation, only one thick line is used to represent the bus in FIG. 16, but this does not mean that there is only one bus or only one type of bus.

It should be understood that the apparatus shown in FIG. 16 may be further configured to implement functions of a receive end, for example, the network device in the method shown in FIG. 14. In this case, the apparatus may be a receive end, or may be an apparatus at the receive end. The apparatus may be a chip system. In this embodiment of this application, the chip system may include a chip, or may include a chip and another discrete device.

The processor in this embodiment of this application may be an integrated circuit chip and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly performed and completed by using a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM). It should be noted that the memory of the systems and methods described in this specification includes but is not limited to these and any memory of another proper type.

According to the method provided in the embodiments of this application, this application further provides a computer program product. The computer program product includes computer program code. When the computer program code is run on a computer, the computer is enabled to perform the method in any one of the embodiments shown in FIG. 4 to FIG. 14.

According to the method provided in the embodiments of this application, this application further provides a computer-readable medium. The computer-readable medium includes computer program code. When the computer program code is run on a computer, the computer is enabled to perform the method in any one of the embodiments shown in FIG. 4 to FIG. 14.

According to the method provided in the embodiments of this application, this application further provides a system, and the system includes the foregoing one or more terminal devices and one or more network devices.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedure or functions according to the embodiments of this application are all or partially generated. The computer may be a general-purpose computer, a dedicated computer, a computer network, a network device, a terminal device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

In the foregoing apparatus embodiments, the network device and the terminal device entirely correspond to the network device and the terminal device in the method embodiments. A corresponding module or unit performs a corresponding step, for example, a communications unit (transceiver) performs a receiving step or a sending step in the method embodiments. Other steps except sending and receiving may be performed by a processing unit (processor). For a function of a specific unit, refer to a corresponding method embodiment. There may be one or more processors.

In this application, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists, where A and B may be singular or plural. The character "/" usually indicates an "or" relationship between the associated objects. "At least one of the following items" or a similar expression means any combination of these items, including any combination of a single item or a plurality of items. For example, at least one of a, b, or c may represent a, b, c, a and b, a and c, b and c, or a, b, and c, where a, b, and c may be a single one, or may be a plurality of.

It should be understood that "an embodiment" or "an embodiment" mentioned in the whole specification does not mean that particular features, structures, or characteristics related to an embodiment are included in at least one embodiment of this application. Therefore, "in an embodiment" or "in an embodiment" appearing throughout the specification does not refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In addition, descriptions of the steps in the figure are merely examples, and should not constitute any limitation on this application.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to a signal having one or more data packets (for example, data from two components interacting with another component in a local system, a distributed system, and/or across a network such as the internet interacting with other systems by using the signal).

A person of ordinary skill in the art may be aware that, in combination with illustrative logical blocks described in the embodiments disclosed in this specification and steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may or may not be physical units, to be specific, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
performing modulation data processing on first modulation data whose length is $M_1$, to obtain second modulation data whose length is $M_2$, wherein $M_1 < M_2$, $M_1$ and $M_2$ are positive integers, and each modulation data in the second modulation data is an element in the first modulation data;
performing sending preprocessing on the second modulation data to obtain time-domain sending data of one symbol, wherein the sending preprocessing comprises Fourier transform and inverse Fourier transform; and
sending the time-domain sending data on the one symbol.

2. The method according to claim 1, wherein $M_2 = K \cdot M_1$, and K is an integer greater than 1.

3. The method according to claim 2, wherein the first modulation data and the second modulation data meet the following relationship:

$$d_2(m_2) = d_1(m_1),\ m_1 = 0, 1, 2, \ldots, M_1-1,\ m_2 = K \cdot m_1 + k,\ m_2 = 0, 1, 2, \ldots, M_2-1,\ k = 0, 1, 2, \ldots, K-1,$$
wherein $d_1$ is the first modulation data, $d_1(m_1)$ is an $m_1^{th}$ element in the first modulation data, $d_2$ is the second modulation data, and $d_2(m_2)$ is an $m_2^{th}$ element in the second modulation data.

4. The method according to claim 3, wherein the sending preprocessing further comprises phase shift or further comprises phase shift and filtering, wherein the filtering comprises frequency domain filtering or time domain filtering, and, wherein:
the phase shift, the Fourier transform, and the inverse Fourier transform are sequentially performed on the second modulation data to obtain the time-domain sending data; or
the phase shift, the Fourier transform, the inverse Fourier transform, and the time domain filtering are sequentially performed on the second modulation data to obtain the time-domain sending data; or
the phase shift, the Fourier transform, the frequency domain filtering, and the inverse Fourier transform are sequentially performed on the second modulation data to obtain the time-domain sending data.

5. The method according to claim 2, wherein the first modulation data and the second modulation data meet the following relationship:

$$d_2(m_2) = d_1(m_1),\ m_1 = 0, 1, 2, \ldots, M_1-1,\ m_1 = m_2 \bmod M_1,\ m_2 = 0, 1, 2, \ldots, M_2-1,\ \text{wherein}$$

mod represents a modulo operation, $d_1$ is the first modulation data, $d_1(m_1)$ is an $m_1^{th}$ element in the first modulation data, $d_2$ is the second modulation data, and $d_2(m_2)$ is an $m_2^{th}$ element in the second modulation data.

6. The method according to claim 5, wherein the sending preprocessing further comprises phase shift and data extraction or further comprises phase shift, filtering, and data extraction, wherein the filtering comprises frequency domain filtering or time domain filtering, and, wherein:
the phase shift and the Fourier transform are sequentially performed on the second modulation data to obtain frequency domain data whose length is $M_2$;
the data extraction is performed on the frequency domain data to obtain extracted frequency domain data whose length is $M_1$, wherein the extracted frequency domain data comprises a plurality of elements in the frequency domain data; and
the inverse Fourier transform is performed on the extracted frequency domain data to obtain the time-domain sending data; or
the frequency domain filtering and the inverse Fourier transform are sequentially performed on the extracted frequency domain data to obtain the time-domain sending data; or
the inverse Fourier transform and the time domain filtering are sequentially performed on the extracted frequency domain data to obtain the time-domain sending data.

7. The method according to claim 6, wherein a location, in the frequency domain data, of each element in the extracted frequency domain data is determined based on a value of K.

8. The method according to claim 1, wherein the first modulation data is determined based on a reference signal.

9. An apparatus, comprising:
a communications interface;
a non-transitory memory storage comprising computer-executable instructions; and
one or more processors in communication with the communications interface and to the non-transitory memory storage, wherein the one or more processors execute the computer-executable instructions to cause the apparatus to perform operations comprising:
performing modulation data processing on first modulation data whose length is $M_1$, to obtain second modulation data whose length is $M_2$, wherein $M_1<M_2$, $M_1$ and $M_2$ are positive integers, and each modulation data in the second modulation data is an element in the first modulation data;

performing sending preprocessing on the second modulation data to obtain time-domain sending data of one symbol, wherein the sending preprocessing comprises Fourier transform and inverse Fourier transform; and sending the time-domain sending data on the one symbol through the communications interface.

10. The apparatus according to claim 9, wherein $M_2=K \cdot M_1$, and K is an integer greater than 1.

11. The apparatus according to claim 10, wherein the first modulation data and the second modulation data meet the following relationship:

$$d_2(m_2)=d_1(m_1), m_1=0, 1, 2, \ldots, M_1-1, m_2=K \cdot m_1+k,$$
$$m_2=0, 1, 2, \ldots, M_2-1, k=0, 1, 2, \ldots, K-1,$$
wherein $d_1$ is the first modulation data, $d_1(m_1)$ is an $m_1^{th}$ element in the first modulation data, $d_2$ is the second modulation data, and $d_2(m_2)$ is an $m_2^{th}$ element in the second modulation data.

12. The apparatus according to claim 11, wherein the sending preprocessing further comprises phase shift or further comprises phase shift and filtering, wherein the filtering comprises frequency domain filtering or time domain filtering, and, wherein:

the phase shift, the Fourier transform, and the inverse Fourier transform are sequentially performed on the second modulation data to obtain the time-domain sending data; or the phase shift, the Fourier transform, the inverse Fourier transform, and the time domain filtering are sequentially performed on the second modulation data to obtain the time-domain sending data; or the phase shift, the Fourier transform, the frequency domain filtering, and the inverse Fourier transform are sequentially performed on the second modulation data to obtain the time-domain sending data.

13. The apparatus according to claim 10, wherein the first modulation data and the second modulation data meet the following relationship:

$$d_2(m_2)=d_1(m_1), m_1=0, 1, 2, \ldots, M_1-1, m_1=m_2 \bmod M_1, m_2=0, 1, 2, \ldots, M_2-1, \text{ wherein}$$

mod represents a modulo operation, $d_1$ is the first modulation data, $d_1(m_1)$ is an $m_1^{th}$ element in the first modulation data, $d_2$ is the second modulation data, and $d_2(m_2)$ is an $m_2^{th}$ element in the second modulation data.

14. The apparatus according to claim 13, wherein the sending preprocessing further comprises phase shift and data extraction or further comprises phase shift, filtering, and data extraction, wherein the filtering comprises frequency domain filtering or time domain filtering, and, wherein:

the phase shift and the Fourier transform are sequentially performed on the second modulation data to obtain frequency domain data whose length is $M_2$;

the data extraction is performed on the frequency domain data to obtain extracted frequency domain data whose length is $M_1$, wherein the extracted frequency domain data comprises a plurality of elements in the frequency domain data; and the inverse Fourier transform is performed on the extracted frequency domain data to obtain the time-domain sending data; or the frequency domain filtering and the inverse Fourier transform are sequentially performed on the extracted frequency domain data to obtain the time-domain sending data; or the inverse Fourier transform and the time domain filtering are sequentially performed on the extracted frequency domain data to obtain the time-domain sending data.

15. The apparatus according to claim 14, wherein a location, in the frequency domain data, of each element in the extracted frequency domain data is determined based on a value of K.

16. The apparatus according to claim 9, wherein the first modulation data is determined based on a reference signal.

17. A non-transitory memory having processor-executable instructions stored thereon, wherein the processor-executable instructions are executable by at least one processor to perform operations comprising:

performing modulation data processing on first modulation data whose length is $M_1$, to obtain second modulation data whose length is $M_2$, wherein $M_1<M_2$, $M_1$ and $M_2$ are positive integers, and each modulation data in the second modulation data is an element in the first modulation data;

performing sending preprocessing on the second modulation data to obtain time-domain sending data of one symbol, wherein the sending preprocessing comprises Fourier transform and inverse Fourier transform; and sending the time-domain sending data on the one symbol.

18. The non-transitory memory according to claim 17, wherein $M_2=K \cdot M_1$, and K is an integer greater than 1.

19. The non-transitory memory according to claim 18, wherein the first modulation data and the second modulation data meet the following relationship:

$$d_2(m_2)=d_1(m_1), m_1=0, 1, 2, \ldots, M_1-1, m_2=K \cdot m_1+k,$$
$$m_2=0, 1, 2, \ldots, M_2-1, k=0, 1, 2, \ldots, K-1,$$
wherein $d_1$ is the first modulation data, $d_1(m_1)$ is an $m_1^{th}$ element in the first modulation data, $d_2$ is the second modulation data, and $d_2(m_2)$ is an $m_2^{th}$ element in the second modulation data.

20. The non-transitory memory according to claim 19, wherein the sending preprocessing further comprises phase shift or further comprises phase shift and filtering, wherein the filtering comprises frequency domain filtering or time domain filtering, and, wherein:

the phase shift, the Fourier transform, and the inverse Fourier transform are sequentially performed on the second modulation data to obtain the time-domain sending data; or the phase shift, the Fourier transform, the inverse Fourier transform, and the time domain filtering are sequentially performed on the second modulation data to obtain the time-domain sending data; or the phase shift, the Fourier transform, the frequency domain filtering, and the inverse Fourier transform are sequentially performed on the second modulation data to obtain the time-domain sending data.

* * * * *